US008298072B2

(12) United States Patent
Saito et al.

(10) Patent No.: US 8,298,072 B2
(45) Date of Patent: Oct. 30, 2012

(54) GAMING MACHINE AND CONTROL METHOD THEREOF

(75) Inventors: Hiroki Saito, Tokyo (JP); Makoto Miyawaki, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 100 days.

(21) Appl. No.: 12/796,197

(22) Filed: Jun. 8, 2010

(65) Prior Publication Data

US 2010/0331073 A1 Dec. 30, 2010

(30) Foreign Application Priority Data

Jun. 24, 2009 (JP) ................................. 2009-150250

(51) Int. Cl.
*G06F 17/00* (2006.01)

(52) U.S. Cl. ........................................................ 463/20

(58) Field of Classification Search ..................... 463/20
See application file for complete search history.

(56) References Cited

U.S. PATENT DOCUMENTS

| | | | | | |
|---|---|---|---|---|---|
| 4,669,731 | A | * | 6/1987 | Clarke | 463/20 |
| 5,178,390 | A | * | 1/1993 | Okada | 273/143 R |
| 5,695,402 | A | * | 12/1997 | Stupak | 463/20 |
| 5,702,303 | A | * | 12/1997 | Takemoto et al. | 463/27 |
| 5,820,459 | A | | 10/1998 | Acres et al. | |
| 5,910,048 | A | * | 6/1999 | Feinberg | 463/25 |
| 6,004,207 | A | * | 12/1999 | Wilson et al. | 463/20 |
| 6,270,409 | B1 | * | 8/2001 | Shuster | 463/20 |
| 6,319,125 | B1 | * | 11/2001 | Acres | 463/25 |
| 6,695,697 | B1 | | 2/2004 | Okada | |
| 7,357,716 | B2 | * | 4/2008 | Marks et al. | 463/27 |
| 7,381,134 | B2 | * | 6/2008 | Cuddy et al. | 463/25 |
| 2007/0060283 | A1 | * | 3/2007 | Okada | 463/17 |
| 2007/0060324 | A1 | * | 3/2007 | Okada | 463/29 |
| 2007/0259709 | A1 | * | 11/2007 | Kelly et al. | 463/20 |
| 2008/0058050 | A1 | * | 3/2008 | Okada | 463/16 |

FOREIGN PATENT DOCUMENTS

| | | | | |
|---|---|---|---|---|
| AU | 2007202727 | A1 | | 10/2008 |
| EP | 1302914 | A2 | * | 4/2003 |
| JP | 2008-229034 | | | 10/2008 |

* cited by examiner

*Primary Examiner* — Xuan Thai
*Assistant Examiner* — Michael Grant
(74) *Attorney, Agent, or Firm* — Edwards Wildman Palmer LLP

(57) ABSTRACT

A slot machine 10 of the present invention is provided with a lower image display panel 141 and a motherboard 70. The slot machine 10 carries out (a1) a process of running a game in which a predetermined number of game media are paid out according to the number of game media having been bet, (a2) a process of counting the number of games run in (a1), (a3) a process of displaying, by a gauge table divided into plural stages, the number of games counted in (a2), and (a4) a process of awarding a predetermined benefit when the number of games counted in (a2) reaches a predetermined game count.

6 Claims, 25 Drawing Sheets

FIG. 8

| | FIRST VIDEO REEL | SECOND VIDEO REEL | THIRD VIDEO REEL | FOURTH VIDEO REEL | FIFTH VIDEO REEL |
|---|---|---|---|---|---|
| CODE No. | SYMBOL | SYMBOL | SYMBOL | SYMBOL | SYMBOL |
| 00 | RABBIT | MONKEY | BISON | A | Q |
| 01 | K | A | K | FEATURE | BIRD |
| 02 | WILD BOAR | BIRD | DEER | A | MONKEY |
| 03 | A | WILD | MONKEY | MONKEY | A |
| 04 | FEATURE | Q | BIRD | K | J |
| 05 | K | DEER | WILD BOAR | BISON | WILD |
| 06 | BISON | K | J | K | WILD |
| 07 | A | RABBIT | DEER | MONKEY | WILD BOAR |
| 08 | BIRD | BISON | MONKEY | J | J |
| 09 | J | J | WILD | RABBIT | MONKEY |
| 10 | DEER | RABBIT | K | WILD BOAR | A |
| 11 | BIRD | Q | Q | FEATURE | BISON |
| 12 | J | DEER | RABBIT | BIRD | BIRD |
| 13 | WILD BOAR | A | A | DEER | Q |
| 14 | MONKEY | RABBIT | FEATURE | RABBIT | DEER |
| 15 | A | FEATURE | Q | K | Q |
| 16 | WILD | MONKEY | A | MONKEY | RABBIT |
| 17 | Q | BIRD | RABBIT | Q | K |
| 18 | MONKEY | WILD BOAR | K | J | FEATURE |
| 19 | RABBIT | Q | BIRD | WILD | RABBIT |
| 20 | DEER | J | Q | Q | K |
| 21 | Q | K | J | RABBIT | BISON |

FIG. 10

| SYMBOL | THREE | FOUR | FIVE |
|---|---|---|---|
| J | 5 | 10 | 50 |
| Q | 5 | 10 | 50 |
| K | 5 | 10 | 50 |
| A | 5 | 10 | 50 |
| BIRD | 10 | 25 | 100 |
| RABBIT | 10 | 25 | 100 |
| MONKEY | 10 | 25 | 100 |
| WILD BOAR | 15 | 30 | 150 |
| DEER | 15 | 50 | 200 |
| BISON | 20 | 75 | 250 |
| WILD (TIGER) | 25 | 100 | 500 |
| FEATURE | FREE GAME (※) | | |

(※)FREE GAME IS RUN WHEN THREE OR MORE SYMBOLS ARE REARRANGED

FIG. 20

| | FIRST VIDEO REEL | SECOND VIDEO REEL | THIRD VIDEO REEL | FOURTH VIDEO REEL | FIFTH VIDEO REEL |
|---|---|---|---|---|---|
| CODE No. | SYMBOL | SYMBOL | SYMBOL | SYMBOL | SYMBOL |
| 00 | RABBIT | MONKEY | BISON | A | Q |
| 01 | K | A | K | FEATURE | BIRD |
| 02 | WILD BOAR | BIRD | DEER | A | MONKEY |
| 03 | A | WILD | MONKEY | MONKEY | A |
| 04 | FEATURE | Q | BIRD | K | J |
| 05 | K | DEER | WILD BOAR | BISON | WILD |
| 06 | BISON | K | J | K | WILD |
| 07 | A | RABBIT | DEER | MONKEY | WILD BOAR |
| 08 | BIRD | BISON | MONKEY | J | J |
| 09 | J | J | WILD | RABBIT | MONKEY |
| 10 | DEER | RABBIT | K | WILD BOAR | A |
| 11 | BIRD | Q | Q | FEATURE | BISON |
| 12 | J | DEER | RABBIT | BIRD | BIRD |
| 13 | WILD BOAR | A | A | DEER | Q |
| 14 | MONKEY | RABBIT | FEATURE | RABBIT | DEER |
| 15 | A | FEATURE | WILD | K | Q |
| 16 | WILD | WILD | WILD | MONKEY | RABBIT |
| 17 | Q | WILD | WILD | Q | K |
| 18 | MONKEY | WILD | K | J | FEATURE |
| 19 | RABBIT | Q | BIRD | WILD | WILD |
| 20 | DEER | J | Q | Q | WILD |
| 21 | Q | K | J | RABBIT | BISON |

FIG.25
(1) RS METER DISPLAY PROCESSING
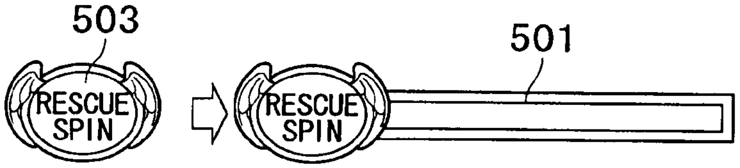
(2) RS METER DELETION PROCESSING
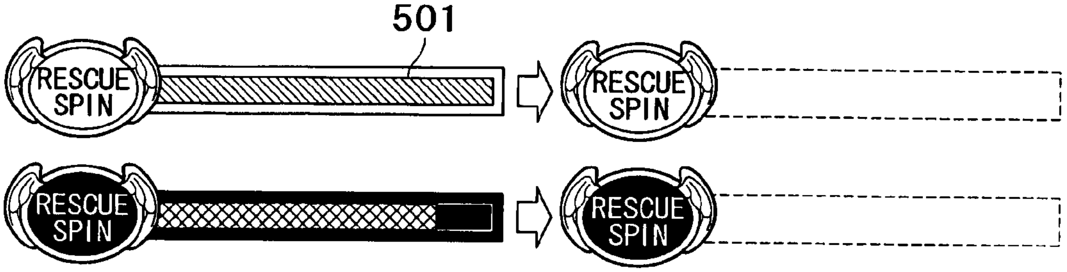
(3) RS METER GRAY DOWN PROCESSING
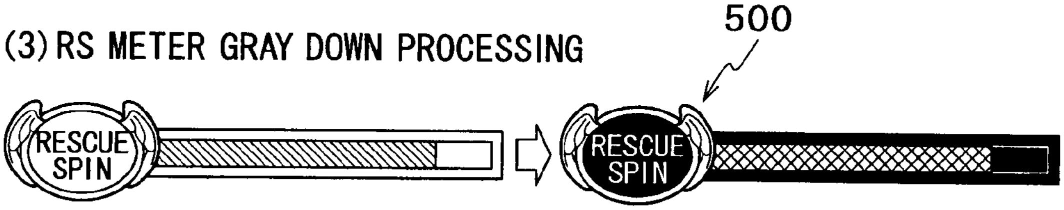
(4) PROCESSING TO RETURN FROM RS GRAY DOWN
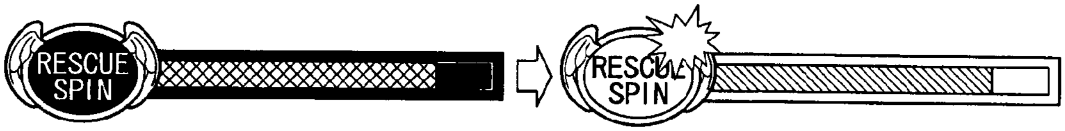
(5) BLOCK MOVING ANIMATION 1 DISPLAY PROCESSING
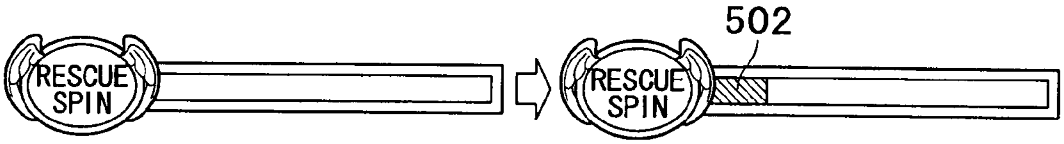
(6) BLOCK MOVING ANIMATION 2 DISPLAY PROCESSING
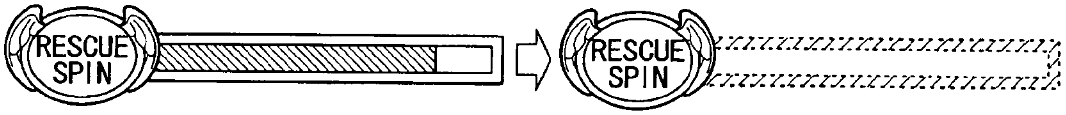

GAMING MACHINE AND CONTROL METHOD THEREOF

CROSS REFERENCE TO RELATED APPLICATION

The present application claims priority from Japanese Patent Application No. 2009-150250, which was filed on Jun. 24, 2009, the disclosure of which is herein incorporated by reference in its entirety.

BACKGROUND OF THE INVENTION

The present invention relates to a gaming machine and a control method thereof.

In gaming facilities in which slot machines or the like (see Patent Documents 1 (U.S. Pat. No. 5,820,459) and 2 (U.S. Pat. No. 6,695,697) for example) are installed as gaming machines, games are playable by inserting various types of game media such as coins and cashes. Each slot machine awards a payout in accordance with a winning state (game result) obtained through the progress of a game.

In a gaming facility having plural slot machines, a winning state may not occur in a predetermined number of games in each slot machine. To award a benefit to a player who cannot achieve a winning state in a predetermined number of games, some slot machines are arranged so that a player receives a consolation if a winning state does not occur in a predetermined number of games (see Patent Documents 3 (U.S. Pat. No. 5,910,048) and 4 (Japanese Unexamined Patent Publication No. 2008-229034), for example).

When playing such a slot machine, a player would want to know how many games must be played until reaching the predetermined number of games for consolation.

SUMMARY OF THE INVENTION

The present invention was done to achieve the objective above, and is arranged so that a player is notified of how many games have been played without achieving an winning state, by a gauge table showing plural stages. The present invention therefore provides a slot machine and a game controlling method which allow the player to recognize the remaining number of games until a benefit is obtained as a result of playing games a predetermined number of times, so as to keep the player playing games with interest and excitement.

The present invention discloses a gaming machine which includes a display; and a controller programmed to execute the following processes of: (a1) running a game in which a predetermined number of game media are paid out according to the number of game media having been bet; (a2) counting the number of games run in (a1); (a3) displaying, on a gauge table divided into plural stages, the number of games counted in (a2); and (a4) awarding a predetermined benefit when the number of games counted in (a2) reaches a predetermined game count.

According to this arrangement, the player is able to know the number of games having been run, by the gauge table which is divided into plural stages. This allows the player to recognize the remaining number of games until a benefit is obtained as a result of playing games the rescue achieving game number of times, so as to keep the player playing games with interest and excitement.

The present invention discloses a gaming machine which includes a display; and a controller programmed to execute the following processes of: (b1) after a game medium whose number is smaller than a predetermined maximum bet amount is bet, running a game in which the plural symbols are variably displayed on the symbol display and the symbols are stopped, and a predetermined number of game media are paid out according to the stopped symbols or a combination of the stopped symbols; (b2) on condition that a predetermined number of game media are inserted, shifting from a non-rescue mode to a rescue mode; (b3) if shifting to the rescue mode is carried out in (b2), displaying a meter table which is divided into a predetermined number of blocks; (b4) determining by lottery a rescue achieving game number; (b5) counting the number games run in the rescue mode; (b6) displaying, by the number of blocks turned on the meter table, the number of games counted in (b5); (b7) awarding a predetermined benefit when the number of games counted in (b5) reaches the rescue achieving game number determined in (b4); and (b8) if the predetermined benefit is awarded in (b7) or if a game resulting in payout of a predetermined number of game media is run before the number of games counted reaches the rescue achieving game number, initializing the rescue achieving game number determined in (b4) and the number of games counted in (b5).

This arrangement allows the player to notify, when a predetermined number of coins are inserted so that the non-rescue mode is shifted to the rescue mode, of the number of games run in the rescue mode, by displaying the meter table divided into a predetermined number of blocks. This allows the player to recognize the remaining number of games until a benefit is obtained as a result of playing games the rescue achieving game number of times, so as to keep the player playing games with interest and excitement.

In addition to the above, the present invention discloses a gaming machine characterized in that, in (b6), the number of games displayed in one of the blocks is calculated by dividing the rescue achieving game number determined in (b4) by the predetermined number of blocks.

According to this arrangement, since the rescue achieving game number is different each time, the game number displayed by each of the blocks can be set in accordance with the rescue achieving game number. This allows the player to visually recognize, as an amount, the remaining number of games to be played until a benefit is awarded when the number of games counted by the rescue game number counter reaches the rescue achieving game number.

In addition to the above, the present invention discloses a gaming machine characterized in that, in (b6), for each of the blocks displayed on the meter, a single number is selected by lottery from the number of games displayed by each of the blocks, and each time the number of games counted in (b5) reaches the number selected for each of the blocks by lottery, one of the blocks of the meter table is turned on.

According to this arrangement, one of the blocks on the meter table is turned on each time the number of games counted reaches the number selected for each block by lottery. The timings to turn on the blocks of the meter table are therefore arranged to be irregular, and hence the player cannot precisely understand the remaining number of games to be played until a benefit is awarded when the number of games reaches the rescue achieving game number, but he/she roughly understands the remaining number of games. This makes it possible to cause the player to play games without letting him/her precisely know the remaining number of games to be played until a benefit is awarded.

The present invention discloses a method of controlling a gaming machine, which includes the steps of: (c1) after a game medium whose number is smaller than a predetermined maximum bet amount is bet, running a game in which the plural symbols are variably displayed on the symbol display and the symbols are stopped, and a predetermined number of game media are paid out according to the stopped symbols or a combination of the stopped symbols; (c2) on condition that a predetermined number of game media are inserted, shifting from a non-rescue mode to a rescue mode; (c3) if shifting to the rescue mode is carried out in (c2), displaying a meter table which is divided into a predetermined number of blocks; (c4) determining by lottery a rescue achieving game number; (c5) counting the number of games run in the rescue mode; (c6) displaying, by the number of blocks turned on the meter table, the number of games counted in (c5); (c7) awarding a predetermined benefit when the number of games counted in (c5) reaches the rescue achieving game number determined in (c4); and (c8) if the predetermined benefit is awarded in (c7) or if a game resulting in payout of a predetermined number of game media is run before the number of games counted reaches the rescue achieving game number, initializing the rescue achieving game number determined in (c4) and the number games counted in (c5), wherein, in (c6), the number of games displayed in one of the blocks is calculated by subtracting the predetermined number of blocks from the rescue achieving game number determined in (c4), for each of the blocks displayed on the meter table, a single number is selected by lottery from the number of games displayed by each of the blocks, and each time the number of games counted in (c5) reaches the number selected by lottery for each of the blocks, one of the blocks of the meter table is turned on.

This arrangement allows the player to notify, when a predetermined number of coins are inserted so that the non-rescue mode is shifted to the rescue mode, of the number of games run in the rescue mode, by displaying the meter table divided into a predetermined number of blocks. This allows the player to recognize the remaining number of games until a benefit is obtained as a result of playing games the rescue achieving game number of times, so as to keep the player playing games with interest and excitement.

Also, since the rescue achieving game number is different each time, the game number displayed by each of the blocks can be set in accordance with the rescue achieving game number. This allows the player to recognize the remaining number of games until a benefit is obtained as a result of playing games the rescue achieving game number of times, so as to keep the player playing games with interest and excitement.

Also, one of the blocks on the meter table is turned on each time the number of games counted reaches the number selected for each block by lottery. The timings to turn on the blocks of the meter table are therefore arranged to be irregular, and hence the player cannot precisely understand the remaining number of games to be played until a benefit is awarded when the number of games reaches the rescue achieving game number, but he/she roughly understands the remaining number of games. This makes it possible to cause the player to play games without letting him/her precisely know the remaining number of games to be played until a benefit is awarded.

The present invention allows a player to know how many games have been played without achieving an winning state, by a gauge table divided into plural stages. The present invention therefore provides a slot machine and a game controlling method which allow the player to recognize the remaining number of games until a benefit is obtained as a result of playing games a predetermined number of times, so as to keep the player playing games with interest and excitement.

BRIEF DESCRIPTION OF THE DRAWINGS

FIG. 8 shows a base game symbol table.

FIG. 10 shows a payout amount determination table.

FIG. 20 shows a free game symbol table.

FIG. 25 shows animation pattern images of the RS meter.

DESCRIPTION OF THE PREFERRED EMBODIMENTS

The following will describe an embodiment of the present invention with reference to the figures.

[Explanation of Function Flow Diagram]

Figure 1:
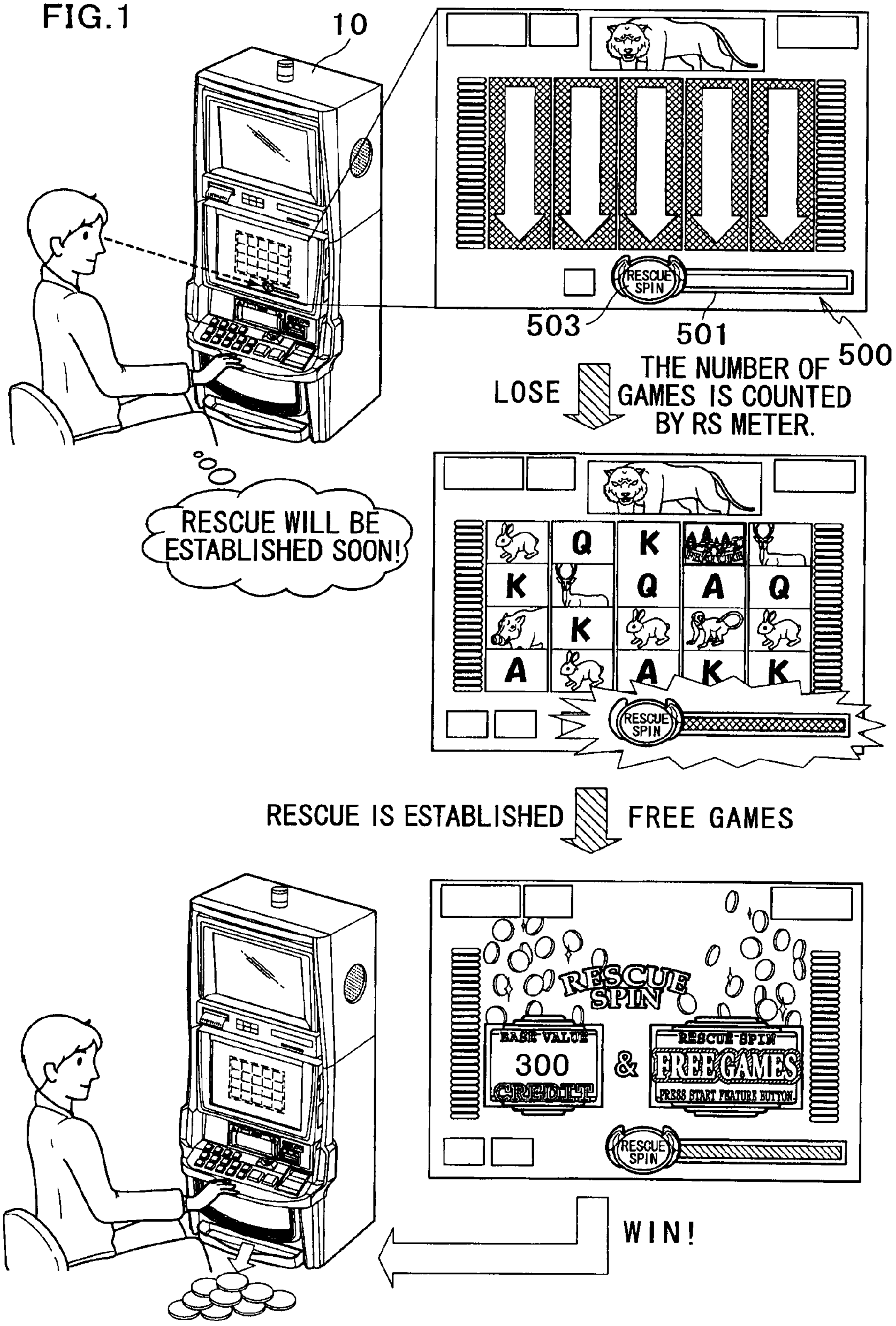
FIG. 1 outlines a game in a gaming machine of an embodiment of the present invention.
Figure 2:
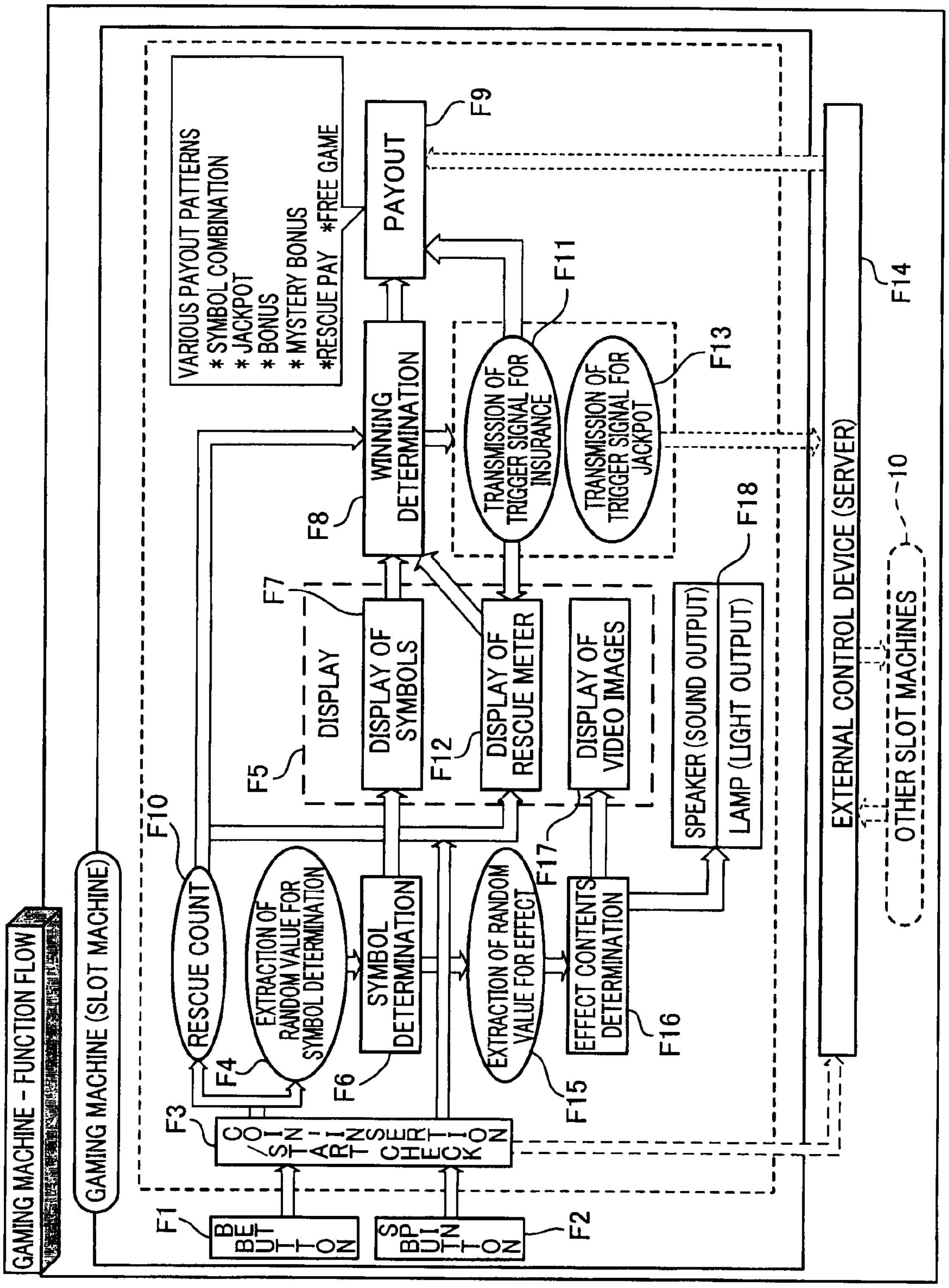
FIG. 2 is a view illustrating a function flow of the gaming machine according to the embodiment of the present invention.

With reference to FIGS. 1 and 2, basic functions of a gaming machine 1 according to the present embodiment are described. FIG. 1 outlines a game in a gaming machine 1 according to the embodiment of the present invention. FIG. 2 is a view illustrating a function flow of the gaming machine 1 according to the embodiment of the present invention.

<Coin-Insertion/Start-Check>

First, as shown in FIG. 2, the gaming machine 1 checks whether or not a BET button F1 has been pressed by a player, and subsequently checks whether or not a spin button F2 has been pressed by the player (F3). At the same time, the remaining credit amount is checked.

<Symbol Determination>

Next, when the spin button F2 has been pressed by the player, the gaming machine 1 extracts random numbers for symbol determination (F4), and determines symbols to be displayed at the time of stopping scrolling of symbol arrays for the player, for a plurality of respective video reels displayed to a display F5 (F6).

<Symbol Display>

Next, the gaming machine 1 starts scrolling of the symbol array of each of the video reels and then stops scrolling so that the determined symbols are displayed for the player (F7).

<Winning Determination>

When scrolling of the symbol array of each video reel has been stopped, the gaming machine 1 determines whether or not a combination of symbols displayed for the player is a combination related to winning (F8).

<Payout>

When the combination of symbols displayed for the player is a combination related to winning, the gaming machine 1 offers benefits according to the combination to the player (F9). For example, when a combination of symbols related to a payout of coins has been displayed, the gaming machine 1 pays out coins of the number corresponding to the combination of symbols to the player.

When it has been determined in the winning determination in F8 that a combination of symbols related to a free game trigger (i.e. trigger symbol) is displayed, the gaming machine 1 starts a free game.

In addition to the above, the gaming machine 1 of the present invention is provided with benefits such as rescue. The rescue is a function to save a player who has not experienced for a long time a game which results in a predetermined benefit such as free game or a game which results in a payout of a predetermined number or more of medals. In the present embodiment, the player can arbitrarily select whether or not to make the rescue effective. To make the rescue effective, a predetermined additional bet is required. In the case where the rescue has been made effective, the gaming machine 1 starts counting the number of games (F10). When it is determined in the Coin-insertion/Start-check that there is no credit amount remaining (e.g. "0"), a rescue meter is displayed in which the counted number of games is divided into plural stages (F12).

When the counted number of games reaches a predetermined number while a game which results in a predetermined benefit such as free game or a game which results in a payout of a predetermined number or more of medals is not run (F8), the gaming machine 1 outputs a rescue trigger signal (F11). Then a benefit for the rescue (e.g. awarding a free game for rescue or payout of medals) is awarded (F9).

When the rescue trigger signal is output (F11), the rescue meter notifies the player that the counted number of games has reached the predetermined number (blinking: see FIG. 1).

Further, in addition to the aforementioned benefits, the gaming machine 1 is provided with benefits such as a mystery bonus and jackpot.

Jackpot is arranged so that, when a combination of symbols related to a jackpot trigger is displayed, an amount of jackpot is paid out to the player. The jackpot refers to a function which accumulates parts of coins used by players at the respective gaming machines 1 as the amount of jackpot and which, when the jackpot trigger has been established in any of the gaming machines, pays out coins of the accumulated amount of jackpot to that gaming machine 1.

In each game, the gaming machine 1 calculates the amount (amount for accumulation) to be accumulated to the amount of jackpot and transmits the calculation result to an external controller F14 (F13). The external controller F14 accumulates to the amount of jackpot the amounts for accumulation transmitted from the respective gaming machines 1.

Mystery bonus is a function to payout a predetermined amount in response to a winning in a special lottery. When the spin button F2 is pressed, the gaming machine 1 samples a random number for mystery bonus and determines by lottery if mystery bonus is established.

<Determination of Effects>

The gaming machine 1 produces effects by displaying images to the display F5 (F17), outputting the light from lamps, and outputting sounds from speakers (F18). The gaming machine 1 extracts a random number for effect (F15) and determines contents of the effects based on the symbols and the like determined by lottery (F16).

[Explanation of Function Flow]

Figure 3:
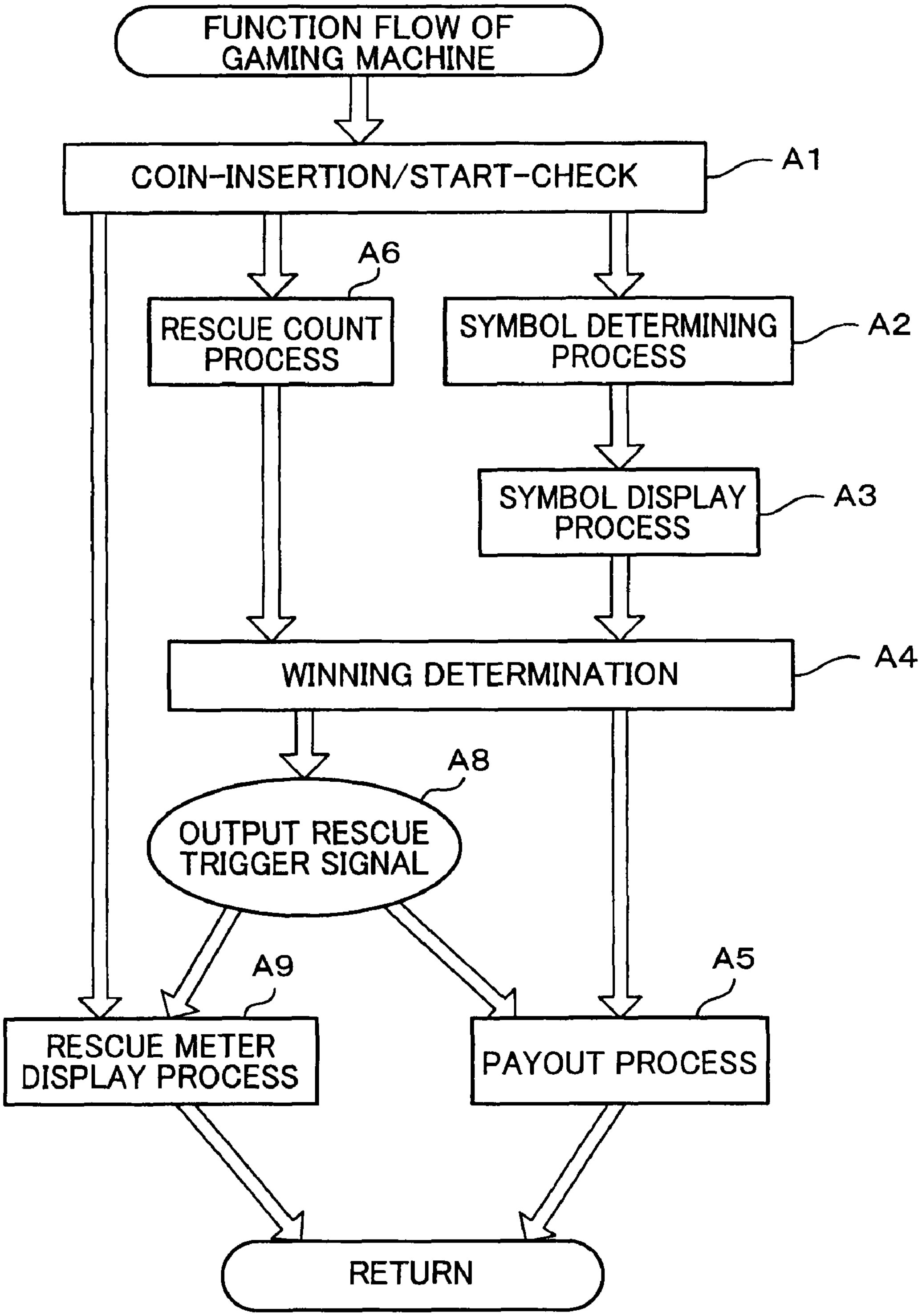
FIG. 3 is a view illustrating a function flow of the gaming machine according to the embodiment of the present invention.

With reference to FIG. 3, a function flow of the gaming machine 1 according to the present embodiment is described. FIG. 3 is a view illustrating a function flow of the gaming machine 1 according to the embodiment of the present invention.

First, the gaming machine 1 checks whether or not a BET button F1 has been pressed by a player, and subsequently checks whether or not a spin button F2 has been pressed by the player (Coin-insertion/Start-check: A1). At the same time, the remaining credit amount is checked.

Next, when the spin button F2 has been pressed by the player, the gaming machine 1 extracts random numbers for symbol determination (F4), and determines symbols to be displayed at the time of stopping scrolling of symbol arrays for the player, for a plurality of respective video reels displayed to a display F5 (Symbol determining process: A2).

Next, the gaming machine 1 starts scrolling of the symbol array of each of the video reels and then stops scrolling so that the determined symbols are displayed for the player (Symbol display process: A3).

When scrolling of the symbol array of each video reel has been stopped, the gaming machine 1 determines whether or not a combination of symbols displayed for the player is a combination related to winning (Winning determination: A4).

When the combination of symbols displayed for the player is a combination related to winning, the gaming machine 1 offers benefits according to the combination to the player (Payout process: A5). For example, when a combination of symbols related to a payout of coins has been displayed, the gaming machine 1 pays out coins of the number corresponding to the combination of symbols to the player.

On the other hand, the gaming machine 1 checks whether the player has pressed a BET button F1 to make a predetermined additional bet for activating the rescue, and then checks whether the player has pressed the spin button F2 (Coin-insertion/Start-check: A1).

If the rescue is activated, the gaming machine 1 starts counting the number of games (Rescue count process: A6).

When the counted number of games reaches a predetermined number while a game which results in a predetermined benefit such as free game or a game which results in a payout of a predetermined number or more of medals are not run (Winning determination: A4), the gaming machine 1 outputs a rescue trigger signal (A8). Then a benefit for the rescue (e.g. awarding a free game for rescue or payout of medals) is awarded (Payout process: A5).

If the rescue trigger signal is output (A8), the rescue meter displays for the player a notification that the counted number of games has reached the predetermined number (Rescue meter display process: A9). For example, the rescue meter blinks.

In the rescue meter display process (A9), if it has been determined in the Coin-insertion/Start-check (A1) that no credit amount remaining (e.g. "0"), a rescue meter in which the counted number of games is divided into plural stages is displayed.

After the processes above, the process of A1 is carried out again. The basic functions of the gaming machine 1 have been described above.

[Overall Game System]

Figure 4:
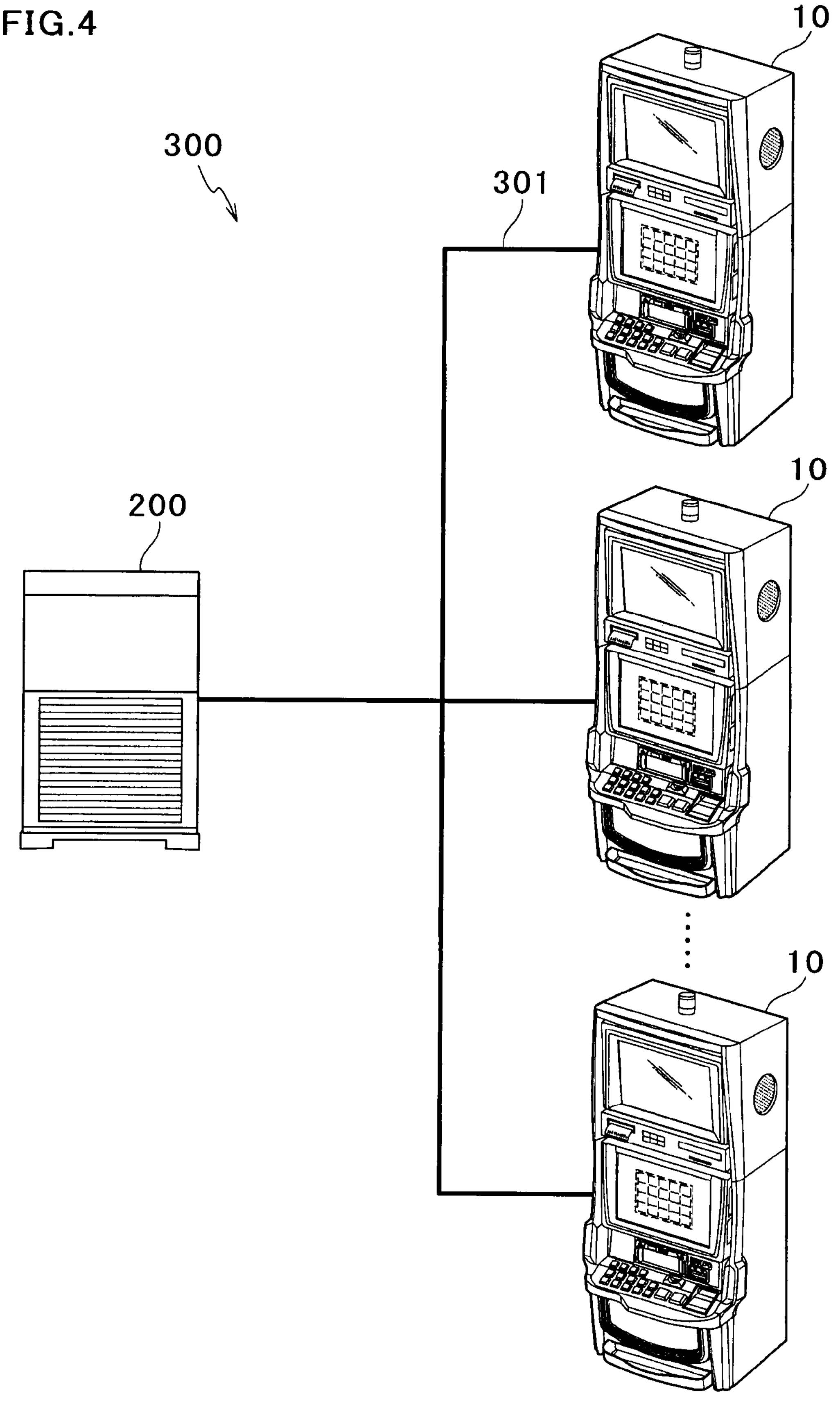
FIG. 4 is a view illustrating a game system including the slot machine according to the embodiment of the present invention.

Now, a game system 300 of the present embodiment in which a slot machine 10 is adopted as the gaming machine 1 will be described with reference to FIG. 4. FIG. 4 is a view illustrating a game system 300 including the slot machine 10 according to the embodiment of the present invention.

The game system 300 includes a plurality of slot machines 10, and an external controller 200 that is connected to each of the slot machines 10 through a communication line 301.

The external controller 200 is for controlling the slot machines 10. In the present embodiment, the external controller 200 is a so-called hall-server provided in a gaming facility having the slot machines 10. Each slot machine 10 is given a unique identification number. The external controller 200 identifies the source of data from any slot machine 10, by referring to the identification number. The identification number is also used for designating the destination, when transmitting data from the external controller 200 to any slot machine 10.

It is to be noted that the game system 300 may be constructed within a single gaming facility where various games can be conducted, such as a casino, or may be constructed among a plurality of gaming facilities. Further, when the game system 300 is constructed in a single gaming facility, the game system 300 may be constructed in each floor or section of the gaming facility. The communication line 301 may be a wired or wireless line, and can adopt a dedicated line, an exchange line or the like.

[Overall Configuration of Slot Machine]

Figure 5:
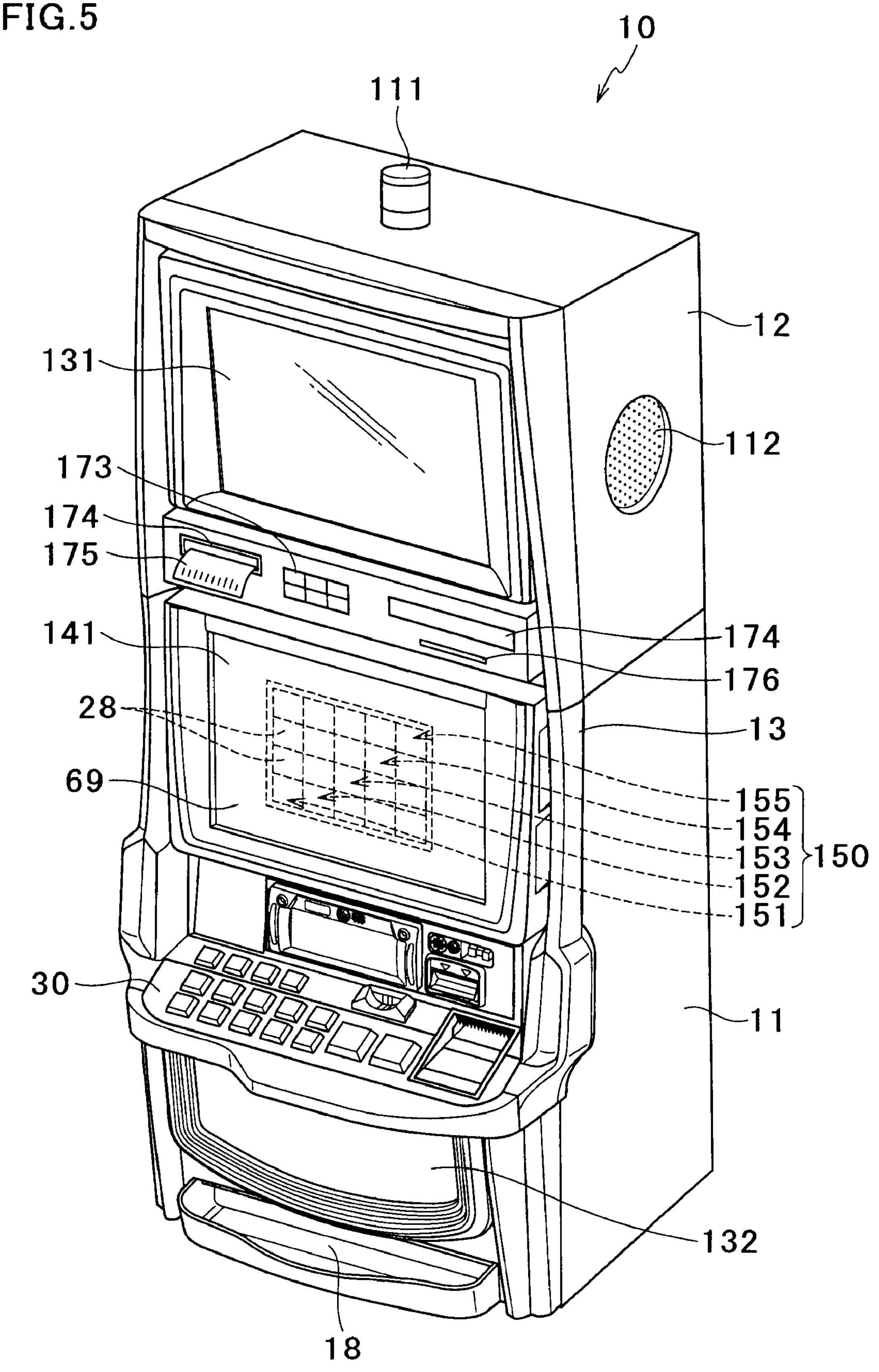
FIG. 5 is a view illustrating the overall configuration of the slot machine according to the embodiment of the present invention.
Figure 6:
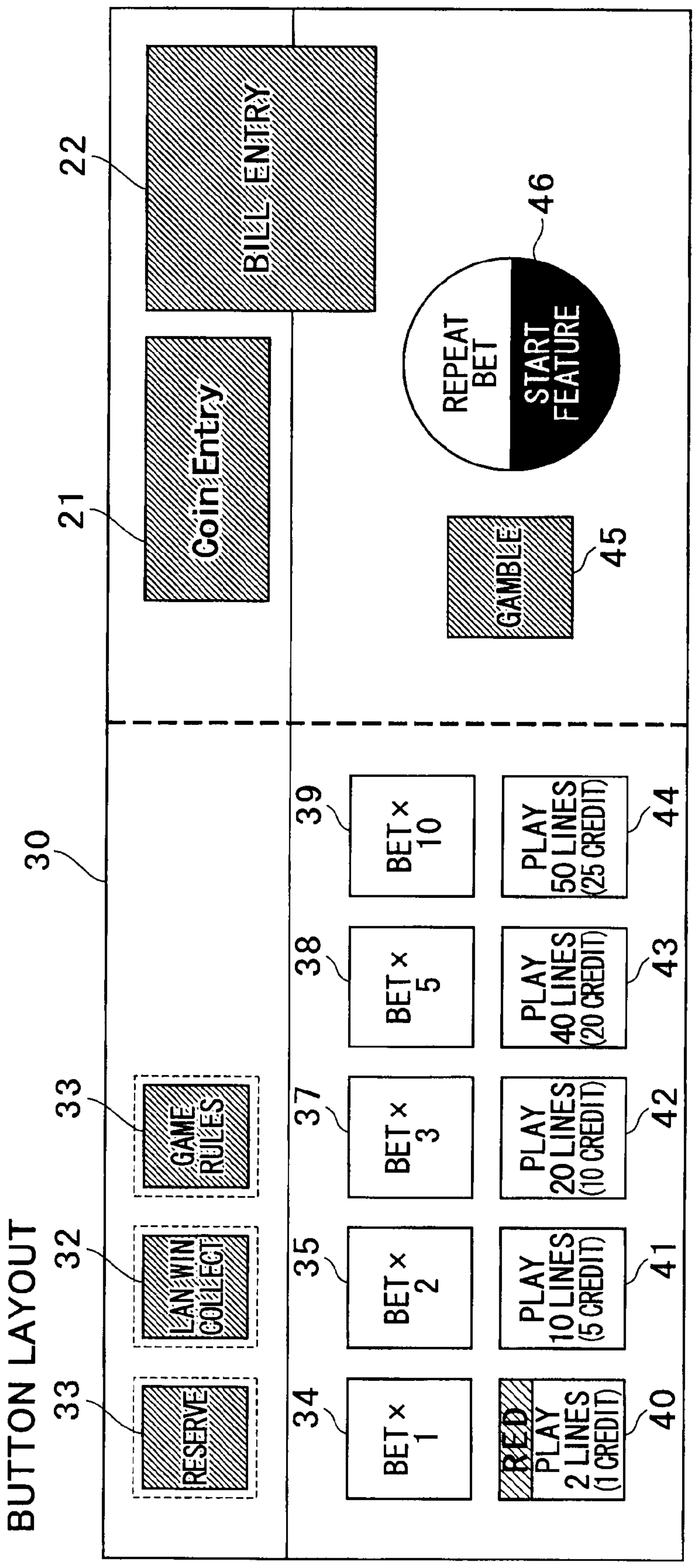
FIG. 6 shows a control panel of the slot machine according to the embodiment of the present invention.

The game system 300 of the present embodiment has been described above. Now, the overall configuration of the slot machine 10 will be described with reference to FIG. 5 and FIG. 6. FIG. 5 is a view illustrating the overall configuration of the slot machine 10 according to the embodiment of the present invention. FIG. 6 shows a control panel 30 of the slot machine 10 according to the embodiment of the present invention.

A coin, a bill, or electronic information equivalent to these is used as a game medium in the slot machine 10. Further, in the present embodiment, a later-described ticket with a barcode is also used. It is to be noted that the game medium is not limited to these, and for example a medal, a token, electronic money or the like can be adopted.

The slot machine 10 includes: a cabinet 11, a top box 12 provided above the cabinet 11, and a main door 13 provided on the front surface of the cabinet 11.

A lower image display panel 141 is provided at the center of the main door 13. The lower image display panel 141 is formed of a transparent liquid crystal panel. A screen displayed on the lower image display panel 141 has a display window 150 at its center. The display window 150 includes twenty display blocks 28 which are arranged in five columns and four rows. The columns form video reels 151 to 155, each having four display blocks 28. The four display blocks 28 in each of the video reels 151 to 155 are displayed as if all the display blocks 28 are moving downward at various speed. This enables rearrangement, in a manner that symbols respectively displayed in the display blocks 28 are rotated in a longitudinal direction and stopped thereafter.

Figure 9:
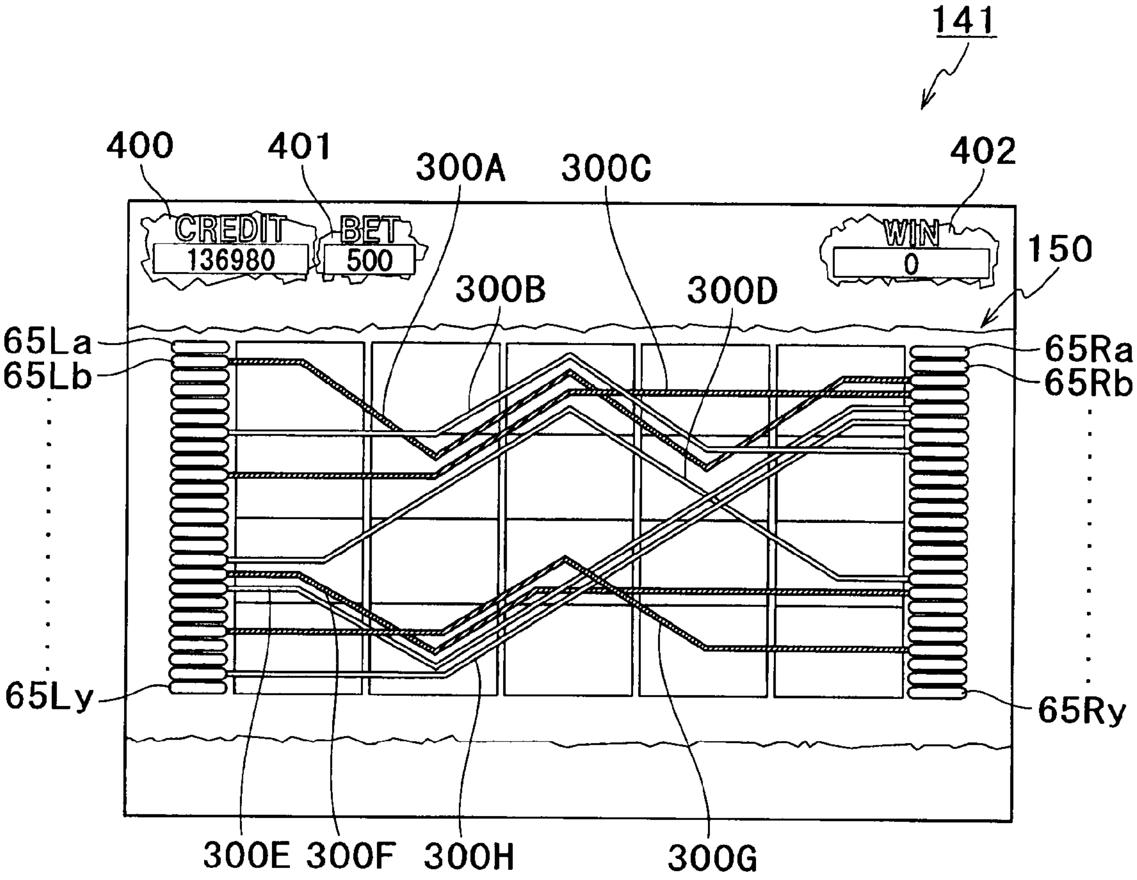
FIG. 9 shows paylines displayed on a lower image display panel of the slot machine according to the embodiment of the present invention.

As shown in FIG. 9, on the left and right sides of the display window 150, symmetrically-arranged payline occurrence columns are respectively disposed. A payline occurrence column on the left when viewed from the front side includes 25 payline occurrence parts 65L (65La to 65Ly).

On the other hand, a payline occurrence column on the right when viewed from the front side includes 25 payline occurrence parts 65R (65Ra to 65Ry).

Each payline occurrence part 65L is paired with one of the payline occurrence parts 65R. Paylines 300 (winning lines L) are prescribed, each extending from one of the payline occurrence parts 65L to one of the payline occurrence parts 65R which are paired with each other. The payline 300A connects the payline occurrence part 65Lb with the payline occurrence part 65Rc. The payline 300B connects the payline occurrence part 65Lg with the payline occurrence part 65Rh. The payline 300C connects the payline occurrence part 65Lj with the payline occurrence part 65Rd. The payline 300D connects the payline occurrence part 65Lp with the payline occurrence part 65Rq. The payline 300E connects the payline occurrence part 65Lr with the payline occurrence part 65Re. The payline 300F connects the payline occurrence part 65Lq with the payline occurrence part 65Rr. The payline 300G connects the payline occurrence part 65Lu with the payline occurrence part 65Rv. The payline 300H connects the payline occurrence part 65Lx with the payline occurrence part 65Rf. Although only 8 paylines 300 are illustrated in FIG. 9 for the sake of easier understanding, the number of the paylines 300 in the present embodiment is 50.

Each payline 300 is activated when the payline 300 connects a pair of payline occurrence parts 65L and 65R. The payline L otherwise is inactive. The number of active paylines 300 is determined based on a bet amount. In the case of MAXBET indicating that the bet amount is maximum 50 paylines 300, i.e. all of the paylines 300 are activated. An activated payline 300 results in various types of winning for each symbol.

The present embodiment deals with a case where the slot machine 10 is a video slot machine. However, the slot machine 10 of the present invention may partially adopt a mechanical reel in place of the video reels 151 to 155.

Further, a not-illustrated touch panel 114 is disposed on a front surface of the upper image display panel 131, and a player is able to input various instructions by operating the touch panel 114. From the touch panel 114, an input signal is transmitted to the main CPU 71.

As shown in FIG. 5 and FIG. 6, below the lower image display panel 141 are provided various buttons on the control panel 30, a coin entry 36 which guides coins into the cabinet 11, and a bill entry 115.

A reserve button 31 is used when a player temporarily leaves the seat or when a player asks a staff person of the gaming facility to exchange money. A collect button 32 is used when coins stored inside the slot machine 10 are paid out to the coin tray 18. A game rule button 33 is pressed when the operating method of a game is unclear. When the game rule button 33 is pressed, various types of help information are displayed on the upper image display panel 131 and the lower image display panel 141.

A 1-BET button 34 is arranged so that, each time the button is pressed, one gaming medium is bet on each activated payline from the current credit owned by the player. A 2-BET button 35 is pressed to start a game on condition that two gaming media are bet on each activated payline. A 3-BET button 37 is pressed to start a game on condition that three gaming media are bet on each activated payline. A 5-BET button 38 is pressed to start a game on condition that five gaming media are bet on each activated payline. A 10-BET button 39 is pressed to start a game on condition that ten gaming media are bet on each activated payline. As such, the bet amount on each activated payline is determined when one of the 1-BET button 34, the 2-BET button 35, the 3-BET button 37, the 5-BET button 38, or the 10-BET button 39 is pressed.

A play-2-lines button 40 activates paylines when pressed. In this case, the number of paylines to be activated is 2. A play-10-lines button 41 activates paylines when pressed. In this case, the number of paylines to be activated is 10. A play-20-lines button 42 activates paylines when pressed. In this case, the number of paylines to be activated is 20. A play-40-lines button activates paylines when pressed. In this case, the number of paylines to be activated is 40. A MAX-lines button 44 activates paylines when pressed. In this case, the number of paylines to be activated is maximum (50).

In the present embodiment, pressing the MAX-lines button 44 automatically results Ante Bet. This Ante Bet is an additional bet to activate the rescue for the game. In other words, the rescue is activated only when a game is played with the MAX lines (Ante Bet).

A gamble button 45 is pressed to, for example, shift to a gamble game after a free game ends. This gamble game is played by using obtained credit.

A start button 46 is used to start the scroll of symbols. This start button 46 is also used to start a free game and to add a payout obtained in a free game to the credit.

The coin entry 36 guides coins into the cabinet 11. The bill entry 115 is for validating the legitimacy of a bill input, and takes into the cabinet 11 a bill recognized as legitimate. On a lower front surface of the main door 13, that is, below the control panel 30, a belly glass 132 on which a character of the slot machine 10 or the like is drawn and a coin tray 18 receiving coins paid out from the cabinet 11 are provided.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The slot machine 10 produces effects by displaying images, outputting sounds, and outputting the light.

A data displayer 174 and a keypad 173 are provided on the lower side of the upper image display panel 131. The data displayer 174 includes a fluorescent display, LEDs and the like, and displays the data input by the player via the keypad 173, for example. The keypad 173 is for inputting data.

[Symbol Array]

The overall configuration of the slot machine 10 has been described above. Next, with reference to FIG. 8, a configuration of the symbol arrays included in the video reels 151-155 of the slot machine 10 is described. FIG. 8 shows a base game symbol table.

The base game symbol table shows arrangements of symbols displayed on the video reels. A first video reel 151, a second video reel 152, a third video reel 153, a fourth video reel 154, and a fifth video reel 155 each is assigned with a symbol array consisting of 22 symbols that correspond to respective code numbers from “00” to “21”.

The types of the symbols are “J”, “Q”, “K”, “A”, “BIRD”, “RABBIT”, “MONKEY”, “WILD BOAR”, “DEER”, “BISON”, “WILD” (“TIGER”), and “FEATURE”.

[Configuration of Circuit Included in Slot Machine]

Figure 7:
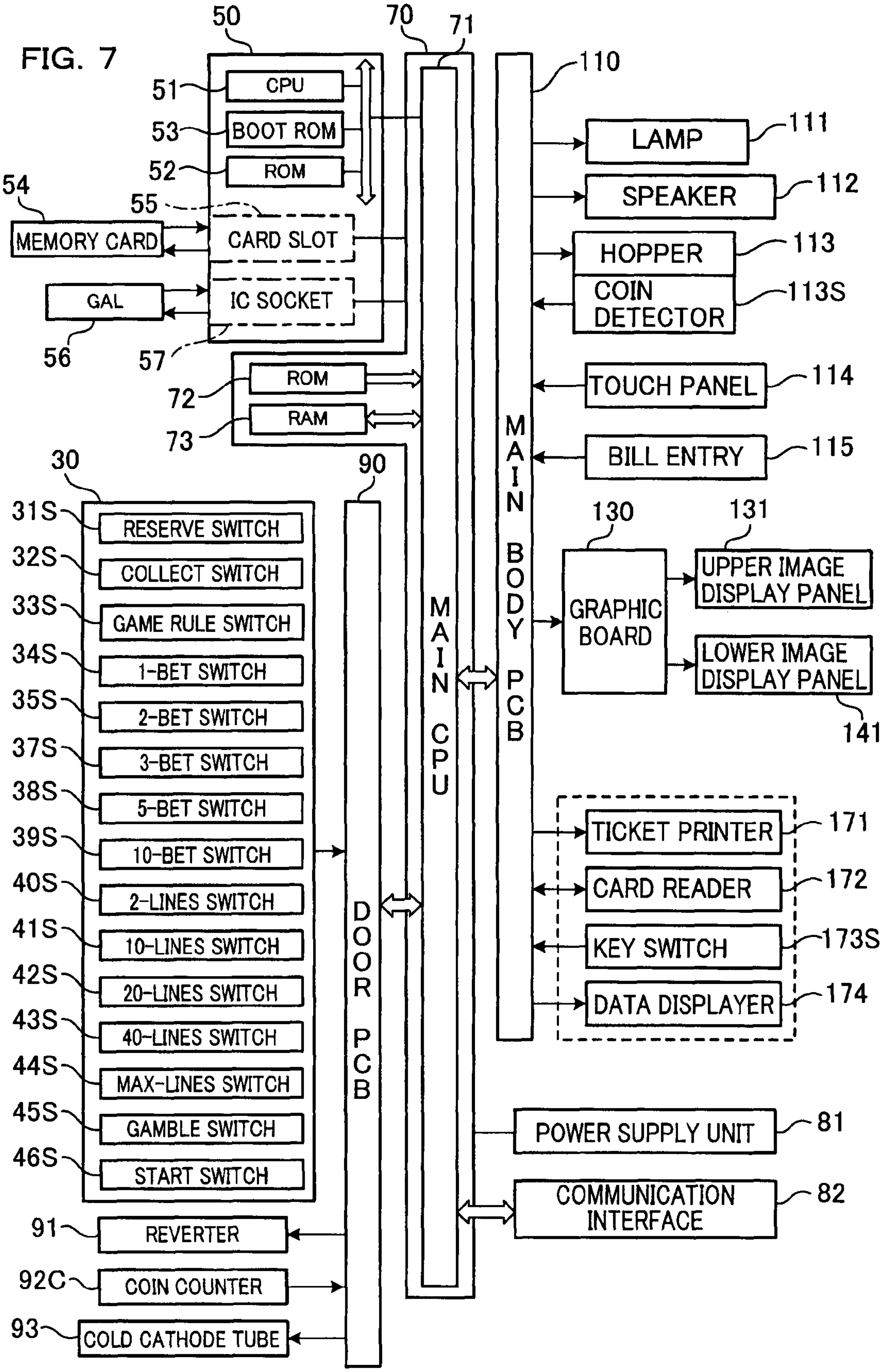
FIG. 7 is a block diagram illustrating an internal configuration of the slot machine according to the embodiment of the present invention.

The configuration of the symbol arrays included in the video reels 151-155 of the slot machine 10 has been described above. Next, with reference to FIG. 7, a configuration of a circuit included in the slot machine 10 is described. FIG. 7 is a block diagram illustrating an internal configuration of the slot machine 10 according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 11 to 19 which are described later). Further, the aforementioned game program includes data (see FIG. 8) specifying the configuration of the symbol array assigned to each video reel 151-155.

The lottery program is a program for determining to-be-stopped symbol of each video reel 151-155 by lottery. The to-be-stopped symbol is data for determining four symbols to be displayed to the display window 150 out of the 22 symbols forming each symbol array. The slot machine 10 of the present embodiment determines as the to-be-stopped symbol the symbol to be displayed in a predetermined area (e.g. the uppermost region) out of the four areas provided for each of the video reels 151-155 of the display window 150.

The aforementioned lottery program includes symbol determination data. The symbol determination data is data that specifies random numbers so that each of the 22 symbols (code numbers from “00” to “21”) forming the symbol array is determined at an equal probability (i.e. 1/22), for each video reel 151-155. The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). It is noted that the probabilities of the respective types of symbols may include a random number.

It is to be noted that, although the data specifies that the equal numbers of symbols be provided to form the symbol arrays of the respective video reels 151-155 in the present embodiment, different numbers of symbols may form the respective video reels 151-155. For example, the symbol array of the first video reel 151 may consist of 22 symbols whereas the symbol array of the second video reel 152 may consist of 30 symbols. Such a configuration increases the degree of freedom in setting the probabilities of the respective types of symbols being determined for each video reel 151-155.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the slot machine 10 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a preliminary authentication program, a program (boot code) to be used by the CPU 51 for activating the preliminary authentication program, and the like. The authentication program is a program (falsification check program) for authenticating the game program and the game system program. The preliminary authentication program is a program for authenticating the aforementioned authentication program. The authentication program and the preliminary authentication program are written along a procedure (authentication procedure) for proving that the program to be the subject has not been falsified.

The motherboard 70 is provided with a main CPU 71, a ROM 72, a RAM 73, and a communication interface 82. The motherboard 70 corresponds to the controller of the present invention.

The ROM 72 includes a memory device such as a flash memory, and stores a program such as BIOS to be executed by the main CPU 71, and permanent data.

When the BIOS is executed by the main CPU 71, processing for initializing predetermined peripheral devices is conducted;

further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program.

The RAM 73 is provided with working areas used for operations in execution of these programs. Examples of the areas include: an area that stores counters for managing the number of games, the number of BETs, the payout amount, the credit amount and the like; and an area that stores symbols (code numbers) determined by lottery. In other words, the RAM 73 functions as a game number counter, a bet amount counter, a payout amount counter, a credit amount counter, and a rescue game number counter which counts the number of games triggering a payout as a result of rescue.

The RAM 73 has a free game count recording region and a stock count recording region. In the free game count recording region is stored remaining game count data which indicates a remaining free game count T. The stock count recording region stores stock count data which indicates a stock count S.

The communication interface 82 is for communicating with the external controller 200 such as a server, through the communication line 301. Further, the motherboard 70 is connected with a later-described door PCB (Printed Circuit Board) 90 and a body PCB 110 by respective USBs.

The motherboard 70 is also connected with a power supply unit 81. When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

The control panel 30 has the following switches corresponding to the aforesaid buttons, respectively: a reserve switch 31S, a collect switch 32S, a game rule switch 33S, a 1-BET switch 34S, a 2-BET switch 35S, a 3-BET switch 37S, a 5-BET switch 38S, a 10-BET switch 39S, a play-2-lines switch 40S, a play-10-lines switch 41S, a play-20-lines switch 42S, a play-40-lines switch 43S, a MAX-lines switch 44S, a gamble switch 45S, and a start switch 46S. Each switch detects that a corresponding button has been pressed by a player, and outputs a signal to the main CPU 71.

Inside the coin entry 36 is provided a reverter 91 and a coin counter 92C. The reverter 91 validates the legitimacy of coins inserted into the coin entry 36, and discharges those not determined as legitimate coins to the coin tray 18. The coin counter 92C detects the received legitimate coins and counts the number of these coins.

The cold cathode tube 93 functions as a backlight installed on the rear face sides of the upper image display panel 131 and the lower image display panel 141, and lights up based on a control signal outputted from the main CPU 71.

The body PCB 110 is connected with a lamp 111, a speaker 112, a hopper 113, a coin detector 113S, a touch panel 114, a bill entry 115, a graphic board 130, a ticket printer 171, a card reader 172, a key switch 173S and a data displayer 174.

The lamp 30 is turned on based on a control signal output from the main CPU 71. The speaker 112 outputs sounds such as BGM, based on a control signal outputted from the main CPU 71.

The hopper 113 pays out a specified number of coins to the coin tray 18, based on a control signal output from the main CPU 71. The coin detector 113S detects coins paid out by the hopper 113, and outputs a signal to the main CPU 71.

The touch panel 114 detects a place on the lower image display panel 141 touched by the player's finger or the like, and outputs to the main CPU 71 a signal corresponding to the detected place. The bill entry 115 outputs, when receiving a legitimate bill, a signal corresponding to the value of the bill to the main CPU 71.

The graphic board 130 controls display of images conducted by the respective upper image display panel 131 and lower image display panel 141, based on a control signal outputted from the main CPU 71. The display window 150 of the lower image display panel 141 displays the five video reels 151-155 by which the scrolling and stop motions of the symbol arrays included in the respective video reels 151-155 are displayed. The graphic board 130 is provided with a VDP generating image data, a video RAM temporarily storing the image data generated by the VDP, and the like.

The lower image display panel 141 displays a credit amount display unit 400 displaying a credit amount stored in the RAM 73, a bet amount display unit 401 displaying a bet amount stored in the RAM 73, and a payout display unit 402 displaying a payout amount stored in the RAM 73. The lower image display panel 141 corresponds to a display of the present invention.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the credit amount stored in the RAM 73, date and time, the identification number of the slot machine 10, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data displayer 174 displays data read by the card reader 172 and data inputted by the player through the keypad 173, based on a control signal outputted from the main CPU 71.

[Determination of Payout Amount]

The circuit configuration of the slot machine 10 has been described above. Next, with reference to FIGS. 9 and 10, how the payout amount is determined is described.

FIG. 9 shows paylines displayed on the lower image display panel 141 of the slot machine 10 according to the embodiment of the present invention. FIG. 10 shows a payout amount determination table.

As illustrated in FIG. 9, on the left of the display window 150 when viewed from the front side are displayed 25 payline occurrence parts 65L (65La to 65Ly). On the other hand, on the right of the display window 150 when viewed from the front side are displayed 25 payline occurrence parts 65R (65Ra to 65Ry).

Each payline occurrence part 65L is paired with one of the payline occurrence parts 65R. Paylines 300 (winning lines L) are prescribed, each extending from one of the payline occurrence parts 65L to one of the payline occurrence parts 65R which are paired with each other. The payline 300A connects the payline occurrence part 65Lb with the payline occurrence part 65Rc. The payline 300B connects the payline occurrence part 65Lg with the payline occurrence part 65Rh. The payline 300C connects the payline occurrence part 65Lj with the payline occurrence part 65Rd. The payline 300D connects the payline occurrence part 65Lp with the payline occurrence part 65Rq. The payline 300E connects the payline occurrence part 65Lr with the payline occurrence part 65Re. The payline 300F connects the payline occurrence part 65Lq with the payline occurrence part 65Rr. The payline 300G connects the payline occurrence part 65Lu with the payline occurrence part 65Rv. The payline 300H connects the payline occurrence part 65Lx with the payline occurrence part 65Rf. Although there are 50 paylines 300, FIG. 9 only shows 8 paylines 300 for the sake of easier understanding.

The payout amount determination table (see FIG. 10) shows how the types and number of symbols rearranged on a payline relate to payout amounts. In the present embodiment, it is determined that a winning is achieved when three or more symbols of the same type, which is one of "J", "Q", "K", "A", "BIRD", "RABBIT", "MONKEY", "WILD BOAR", "DEER", and "BISON", are rearranged on a payline 300.

As to the symbol "WILD" ("TIGER"), it is determined that a winning is achieved if this type of symbol is rearranged three or more on a payline 300 in a base game. On the other hand, it is not determined that a winning is achieved when, in a free game, three or more "WILD" ("TIGER") are rearranged on a payline 300. The "WILD" ("TIGER") is a symbol (wild symbol) substitutable for any type of symbol in a free game. That is to say, a case where two "J" and one "WILD" ("TIGER") are rearranged on a single payline in a free game is equivalent to a case where three "J" are displayed on a payline, and hence this case is recognized as a winning combination.

When three or more "FEATURE" which is a trigger symbol are rearranged on the display window 150, "free game trigger" is selected as a winning combination. When three or more "BISON" are rearranged, "jackpot" is selected as a winning combination.

As shown in FIG. 9, the lower image display panel 141 also displays the credit amount display unit 400, the bet amount display unit 401, and the payout display unit 402. The credit amount display unit 400 indicates the number of coins in the credit. The bet amount display unit 401 indicates the number of coins bet. The payout display unit 402 indicates the number of coins to be paid out.

[RS Meter]

Figure 23:
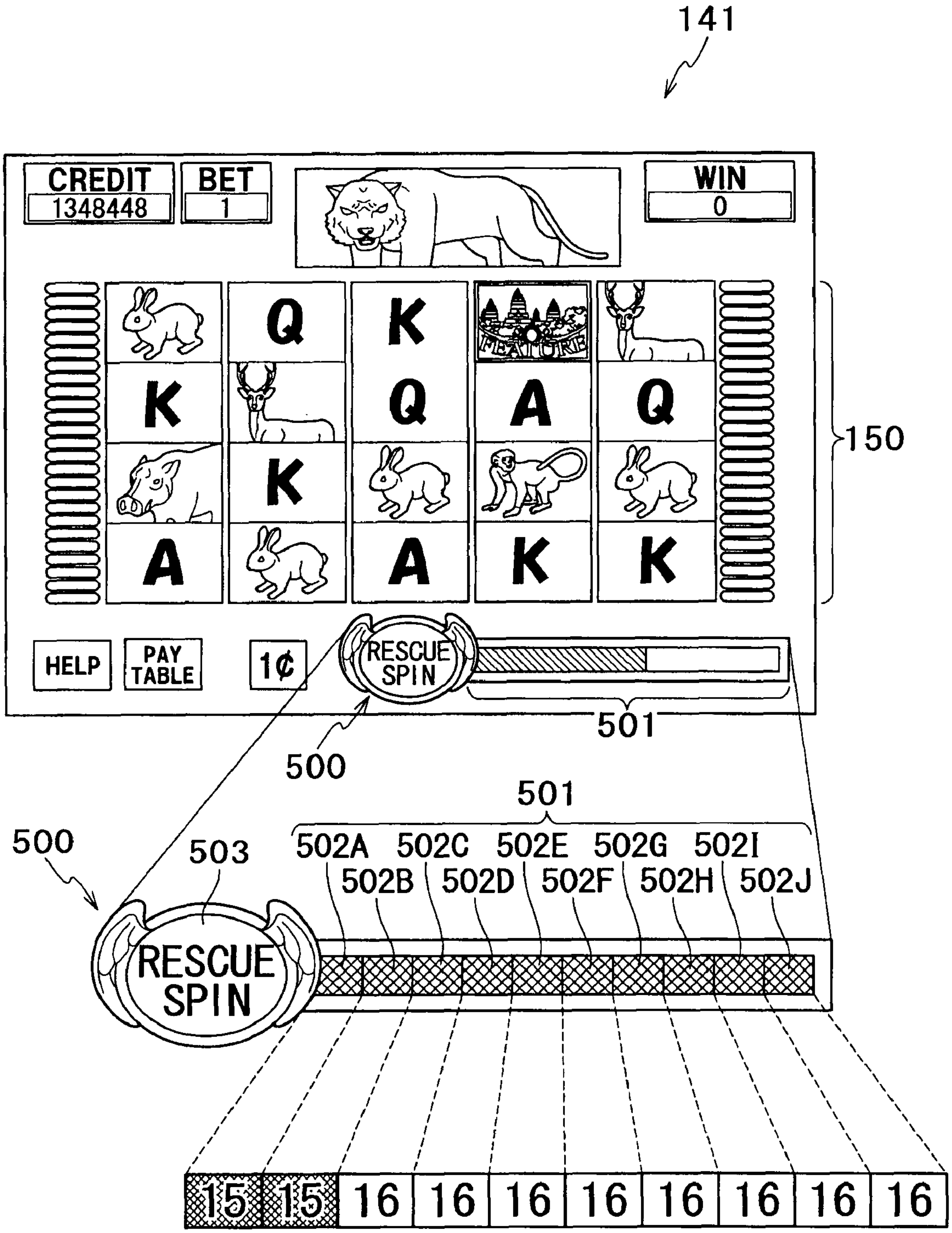
FIG. 23 illustrates an RS meter displayed on the lower image display panel.
Figure 24:
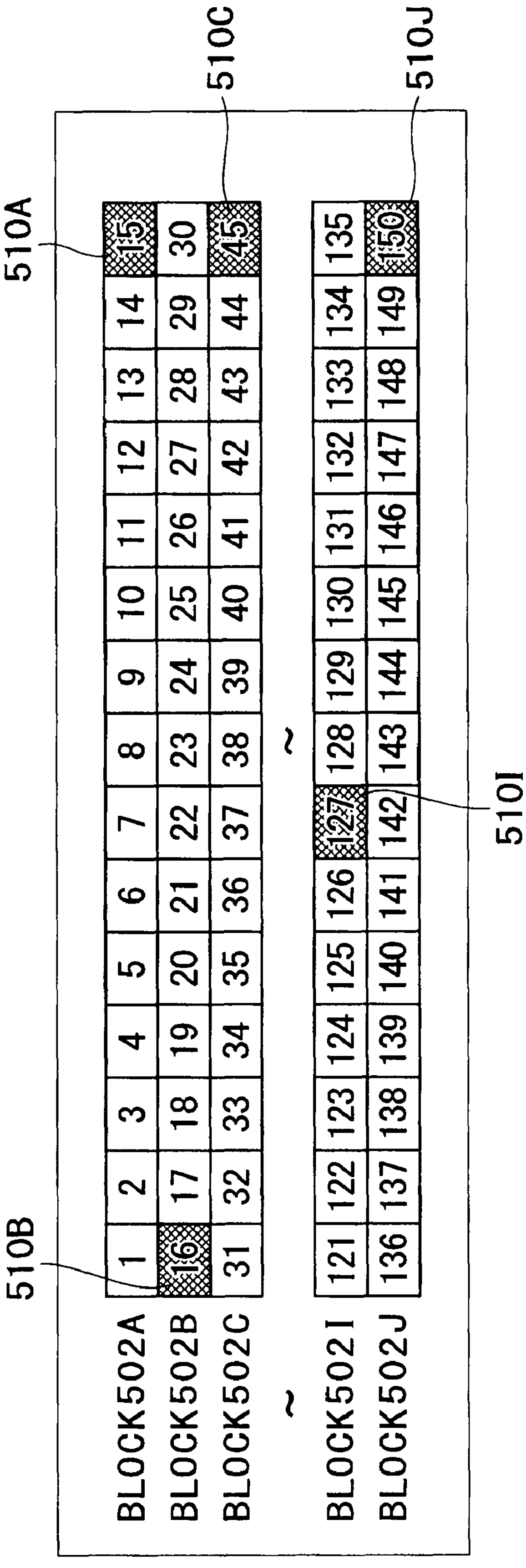
FIG. 24 illustrates turn-on points in the RS meter.

Now, a RS meter 500 will be described with reference to FIG. 23 and FIG. 24. FIG. 23 illustrates a RS meter 500 displayed on the lower image display panel 141. FIG. 24 illustrates turn-on points 510A-510J on the RS meter 500.

The configuration of the RS meter 500 will be described first. As shown in FIG. 23, the RS meter 500 is displayed in the lower part of the display window 150. This RS meter 500 is made up of a block unit 501 which is a meter table divided into ten blocks 502A-503J and a text portion 503 displaying a text "RESCUE SPIN". Then a predetermined number of blocks 502A-502J of the block unit 501 in the RS meter 500 are turned on according to the counted value of the rescue game number counter.

More specifically, as the rescue game number counter increases, the blocks 502A-502J of the block unit 501 in the RS meter 500 serially turn on from left to right. This allows the player to visually recognize the value counted by the rescue game number counter by the number of blocks 502A-J of the RS meter 500, which have been turned on.

Now, the following will describe the number of games displayed on the blocks 502A-502J in a game to which Ante Bet has been done and hence the rescue is set. The block unit 501 of the RS meter 500 is divided into ten blocks 502A-502J. The number of games displayed on a single block is calculated by dividing a rescue achieving game number determined in S225 by 10 which is the number of the blocks. In the present embodiment, the rescue achieving game number is selected from a numerical range of 150 to 350. According to this arrangement, for example, when the rescue achieving game number is 150, the number of games displayed on a single block is 15 because 150/10=15. When the rescue achieving game number is 158, 8 blocks out of 10 blocks display "16" and the remaining 2 blocks display "15" because 158/10=15.8. As shown in FIG. 23, the blocks displaying "16" games (i.e. those displaying the larger number) are selected from the left, i.e. from the block 502C to the block 502J. In the meanwhile, the blocks displaying "15" games (i.e. those display the smaller number) are the blocks 502A and 503B.

Now, timings to turn on the blocks 502A-502J will be described. From the number of games displayed on each of the blocks 502A-502J, one number is selected by lottery. Thereafter, each time the value of the rescue game number counter reaches the selected number, the blocks 502A-502J of the block unit 501 are serially turned on from the left.

For example, as shown in FIG. 24, when the rescue achieving game number is 150, the number of games displayed in one block is 15. A single number is selected by lottery from the number of games "15" displayed on each of the blocks 502A-502J. Assume that "15" is selected in the block 502A (turn-on point 510A), "1" is selected in the block 502B (turn-on point 510B), "15" is selected in the block 502C (turn-on point 510C), "7" is selected in the block 502I (turn-on point 510I), and "15" is selected in the block 502J (turn-on point 510J). The selection of numbers by lottery is similarly carried out in the blocks 502D-502H. As a result, as shown in FIG. 24, each time the value counted by the rescue game number counter reaches the turn-on points 510A-510J, the blocks 502A-502J of the block unit 501 is turned on one-by-one from the left.

More specifically, when the value of the rescue game number counter reaches "15", the block 502A is turned on. Also, when the value of the rescue game number counter reaches "16", the block 502B is turned on. Also, when the value of the rescue game number counter reaches "45", the block 502C is turned on. Similarly, when the value of the rescue game number counter reaches "127", the block 502I is turned on. Also, when the value of the rescue game number counter reaches "150", the block 502J is turned on. As to the block 502J, the turn-on point 510J may be fixed to "15" without conducting lottery.

[Animation Pattern of RS Meter]

Now, an animation pattern of the RS meter 500 will be described with reference to FIG. 25. FIG. 25 shows an animation pattern image of the RS meter 500.

First, (1) in the display processing on the RS meter, an animation is displayed to indicate a shift from a state in which only the text portion 503 of the RS meter 500 is displayed to a state in which the block unit 501 is displayed (see FIG. 25(1)). This allows the player to recognize that "Ante Bet" has been done, i.e. the rescue has been set in the game.

Thereafter, (2) in the deletion processing on the RS meter, on the contrary to the display processing (1) of the RS meter, an animation is displayed to indicate a shift from a state in which the text portion 503 and the block unit 501 of the RS meter 500 are displayed to a state in which only the text portion 503 of the RS meter 500 is displayed (see FIG. 25(2)). This notifies the player that the rescue game number counter has been reset, i.e. a predetermined benefit has been awarded.

Thereafter, (3) in the gray down processing in the RS meter, an animation is displayed to indicate a shift from a state in which the RS meter 500 is displayed to a state in which the entirety of the RS meter 500 is in half tone (see FIG. 25(3)). This notifies the player that the current game is not an "Ante Bet" game, i.e. the game is not a target of the rescue.

Subsequently, (4) in the processing to return from the gray down, on the contrary to the gray down processing (3) in the RS meter, an animation is displayed to indicate a shift from a state in which the entirety of the RS meter 500 is in half tone to a state in which the half tone is removed (see FIG. 25(4)). This notifies the player of a shift from a state of no Ante Bet to a state of Ante Bet, i.e. a game to which the rescue is applied.

Subsequently, in (5) a block moving animation 1 display processing, a predetermined number of the blocks 502 of the block unit 501 in the RS meter 500 are turned on according to the counted value of the rescue game number counter. More specifically, as the rescue game number counter increases, the blocks 502 of the block unit 501 in the RS meter 500 are turned on one-by-one from the left to the right (see FIG. 25(5)). This allows the player to visually recognize, as an amount, the remaining number of games to be played until a benefit is awarded when the number of games counted by the rescue game number counter reaches the rescue achieving game number.

Subsequently, (6) in a block moving animation 2 display processing, the entirety of the RS meter 500 is arranged to blink. More superficially, when the rightmost block 502 of the block unit 501 in the RS meter 500 is turned on, the entirety of the RS meter 500 blinks. This notifies the player that the number of games counted by the rescue game number counter reaches the rescue achieving game number.

[Contents of Program]

Next, with reference to FIGS. 11 to 19, the program to be executed by the slot machine 10 is described.

<Main Control Processing>

Figure 11:
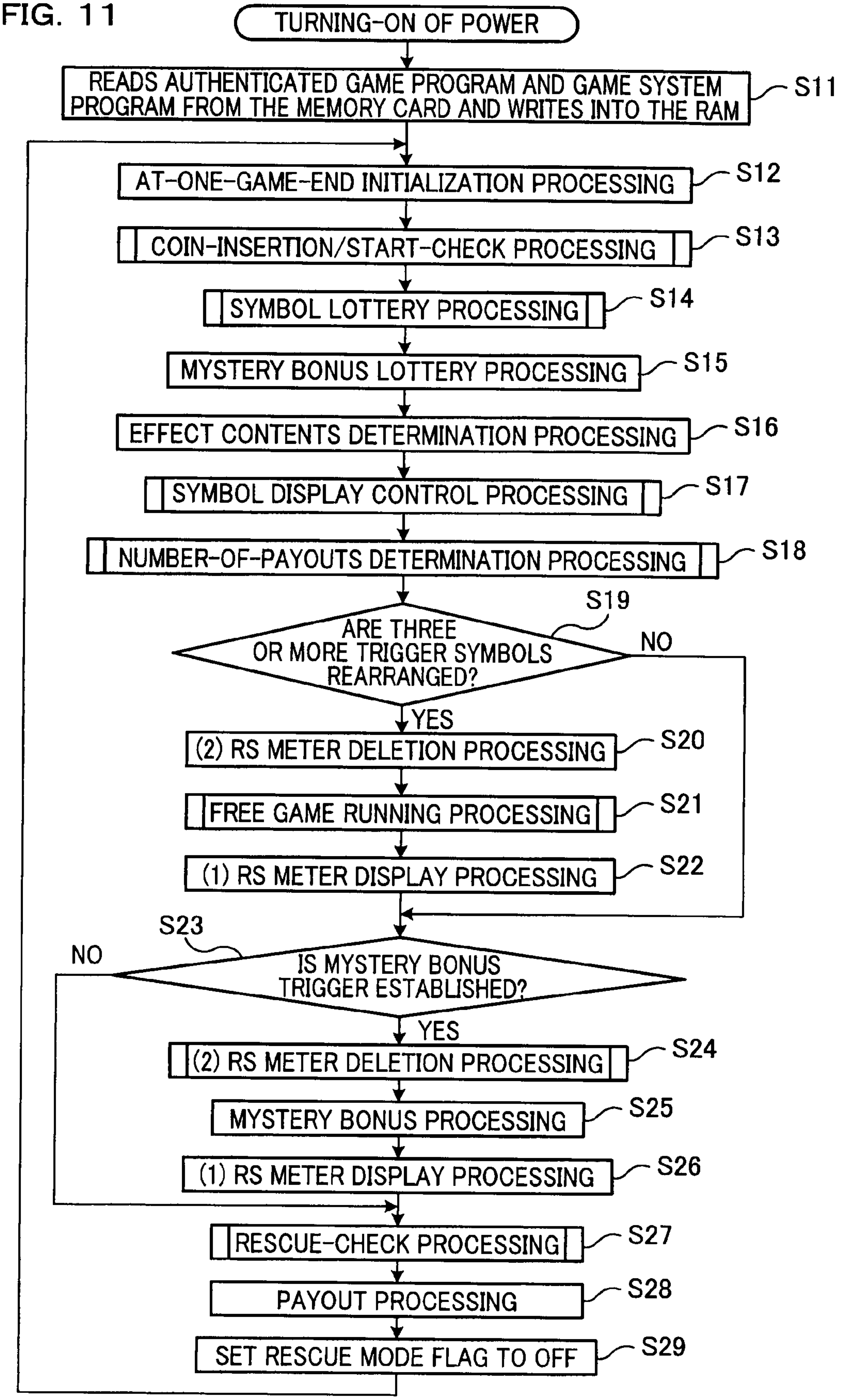
FIG. 11 is a view illustrating a flowchart of the main control processing for the slot machine according to the embodiment of the present invention.

First, with reference to FIG. 11, main control processing is described. FIG. 11 is a view illustrating a flowchart of the main control processing for the slot machine 10 according to the embodiment of the present invention.

First, when the power is supplied to the slot machine 10, the main CPU 71 reads the authenticated game program and game system program from the memory card 54 through the gaming board 50, and writes the programs into the RAM 73 (S11).

Next, the main CPU 71 conducts at-one-game-end initialization processing (S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 12 (S13). In the processing, input from the BET switch and the start switch 46S is checked.

The main CPU 71 then conducts symbol lottery processing which is described later with reference to FIG. 15 (S14). In the processing, to-be-stopped symbols are determined based on the base game symbol table and the random numbers for symbol determination.

Next, the main CPU 71 conducts mystery bonus lottery processing (S15). In the processing, lottery determining whether or not to establish a mystery bonus trigger is held. For example, the main CPU 71 extracts a random number for mystery bonus from the numbers in a range of "0 to 99", and establishes the mystery bonus trigger when the extracted random number is "0".

The main CPU 71 conducts effect contents determination processing (S16). The main CPU 71 extracts a random number for effect, and determines any of the effect contents from the preset plurality of effect contents by lottery.

The main CPU 71 then conducts symbol display control processing which is described later with reference to FIG. 16 (S17). In the processing, scrolling of the symbol array of each video reel 151-155 is started, and the to-be-stopped symbol determined in the symbol lottery processing of S14 is stopped at a predetermined position (e.g. the upper area in the display window 150). That is, four symbols including the to-be-stopped symbol are displayed in the display window 150. For example, when the to-be-stopped symbol is the symbol associated with the code number of "10" and it is to be displayed to the upper area, the symbols associated with the respective code numbers of "11", "12" and "13" are to be displayed to the respective upper central area, lower central area, and lower area in the display window 150.

Next, the main CPU 71 conducts payout amount determination processing which is described later with reference to FIG. 17 (S18). In the processing, the payout amount is determined based on the combination of symbols displayed along the winning line L (payline 300) and is stored into the payout amount counter provided in the RAM 73.

Subsequently, the main CPU 71 determines whether three or more trigger symbols ("FEATURE") are rearranged (S19). In this process, the main CPU 71 determines whether three or more trigger symbols ("FEATURE") are rearranged on the display window 150, without taking into consideration of the winning lines L (paylines 300).

When it is determined that three or more trigger symbols ("FEATURE") are rearranged, the main CPU 71 carries out (2) RS meter deletion processing (S20). In this process, the block unit 501 of the RS meter 500 is deleted from the lower image display panel 141.

Thereafter, free game running processing is carried out (S21). This free game running processing will be detailed later with reference to FIG. 19. After S21, (1) processing to display the RS meter is carried out (S22). In this process, an animation is displayed to indicate a shift from a state in which only the text portion 503 of the RS meter 500 is displayed to a state in which the block unit 501 is displayed (see FIG. 25(1)).

If it is determined in S19, that three or more trigger symbols ("FEATURE") are not rearranged, or after the process in S22, the main CPU 71 determines whether a mystery bonus trigger has been established (S23). When determining that the mystery bonus trigger has been established, the main CPU 71 conducts (2) the RS meter deletion processing (S24). In this process, the block unit 501 of the RS meter 500 is deleted from the lower image display panel 141, if it has been displayed.

Thereafter, mystery bonus processing is carried out (S25). In the processing, the payout amount (e.g. 300) being set for the mystery bonus is stored into the payout amount counter provided in the RAM 73. After S25, (1) processing to display the RS meter is carried out (S26). In this processing, an animation is displayed to indicate a shift from a state in which only the text portion 503 of the RS meter 500 is displayed to a state in which the block unit 501 is displayed (see FIG. 25(1)).

After the processing of S26 or when determining in S23 that the mystery bonus trigger has not been established, the main CPU 71 conducts rescue check processing which is described later with reference to FIG. 18 (S27). In the processing, whether or not to conduct payout by the rescue is checked.

The main CPU 71 then conducts payout processing (S28). The main CPU 71 adds the value stored in the payout amount counter to the credit amount counter provided in the RAM 73. It is to be noted that operations of the hopper 113 may be controlled based on input from the collect switch 32S, and coins of the number corresponding to the value of the payout amount counter may be discharged to the coin tray 18. Further, operations of the ticket printer 171 may be controlled and a ticket with a barcode may be issued on which a value stored in the payout amount counter is recorded.

After the payout processing, a rescue mode flag is set to off (S29). After the processing has been conducted, the processing is shifted to S12.

<Coin-Insertion/Start-Check Processing>

Figure 12:
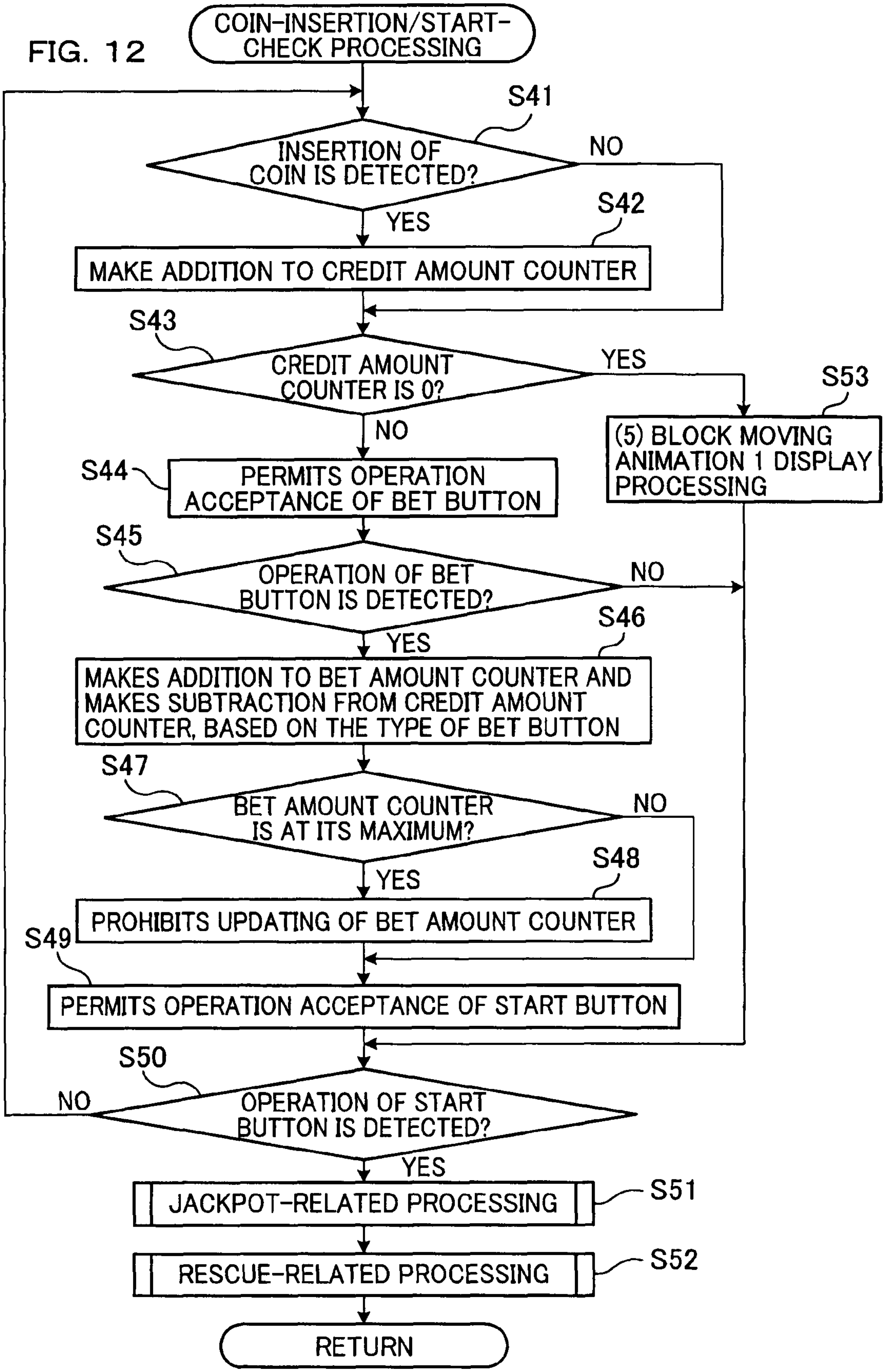
FIG. 12 is a view illustrating a flowchart of the coin-insertion/start-check processing for the slot machine according to the embodiment of the present invention.

Next, with reference to FIG. 12, coin-insertion/start-check processing is described. FIG. 12 is a view illustrating a flowchart of the coin-insertion/start-check processing for the slot machine 10 according to the embodiment of the present invention.

First, the main CPU 71 determines whether or not insertion of a coin has been detected by the coin counter 92C (S41). When determining that the insertion of a coin has been detected, the main CPU 71 makes an addition to the credit amount counter (S42). It is to be noted that, in addition to the insertion of a coin, the main CPU 71 may determine whether or not insertion of a bill has been detected by the bill entry 115, and when determining that the insertion of a bill has been detected, the main CPU 71 may add a value according to the bill to the credit amount counter.

After S42 or when determining in S41 that the insertion of a coin has not been detected, the main CPU 71 determines whether or not the credit amount counter indicates zero (S43). If it is determined that the credit amount counter indicates zero, the main CPU 71 carries out (5) block moving animation 1 display processing (S53). In this processing, an animation is displayed so that a predetermined number of blocks 502 of the block unit 501 in the RS meter 500 are turned on according to the counted value of the rescue game number counter.

In this regard, typically a player playing a game at a slot machine 10 may stop playing when the remaining credit amount (credit amount counter) reaches "0". However, in the arrangement above, when the credit amount counter reaches "0", an animation is displayed so that a predetermined number of the blocks 502 of the block unit 501 in the RS meter 500 are turned on according to the counted value of the rescue game number counter, thereby allowing the player to visually recognize, as an amount, the remaining number of games to be played until a benefit is awarded when the number of games counted by the rescue game number counter reaches the rescue achieving game number. In other words, it is possible to provide the player who is about to end the playing with an expectation of a benefit resulting from a winning in a rescue game, so as to motivate the player to continue the playing.

On the other hand, when the main CPU 71 determines that the value of the credit amount counter is not zero, the main CPU 71 permits operation acceptance of the BET buttons (S44).

Next, the main CPU 71 determines whether or not operation of any of the BET buttons has been detected (S45). When the main CPU 71 determines that the BET switch has detected press of the BET button by the player, the main CPU 71 makes an addition to the bet amount counter provided in the RAM 73 and makes a subtraction from the credit amount counter, based on the type of the BET button (S46).

The main CPU 71 then determines whether or not the value of the bet amount counter is at its maximum (S47). When the main CPU 71 determines that the value of the bet amount counter is at its maximum, the main CPU 71 prohibits updating of the bet amount counter (S48). After S48 or when determining in S47 that the value stored in the bet amount counter is not at its maximum, the main CPU permits operation acceptance of the start button 46 (S49).

After S49 or when determining in S45 that the operation of any of the BET buttons has not been detected, or after S53, the main CPU 71 determines whether or not operation of the start button 46 has been detected (S50). When the main CPU 71 determines that the operation of the start button 46 has not been detected, the processing is shifted to S41.

When the main CPU 71 determines that the operation of the start button 46 has been detected, the main CPU 71 conducts jackpot-related processing which is described later with reference to FIG. 13 (S51). In the processing, the amount to be accumulated to the amount of jackpot is calculated, and the amount is transmitted to the external controller 200.

Next, the main CPU 71 conducts rescue-related processing which is described later with reference to FIG. 14 (S52). In the processing, counting of the number of games is conducted which triggers a payout by the rescue. After the processing has been conducted, the coin-insertion/start-check processing is completed.

<Jackpot-Related Processing>

Figure 13:
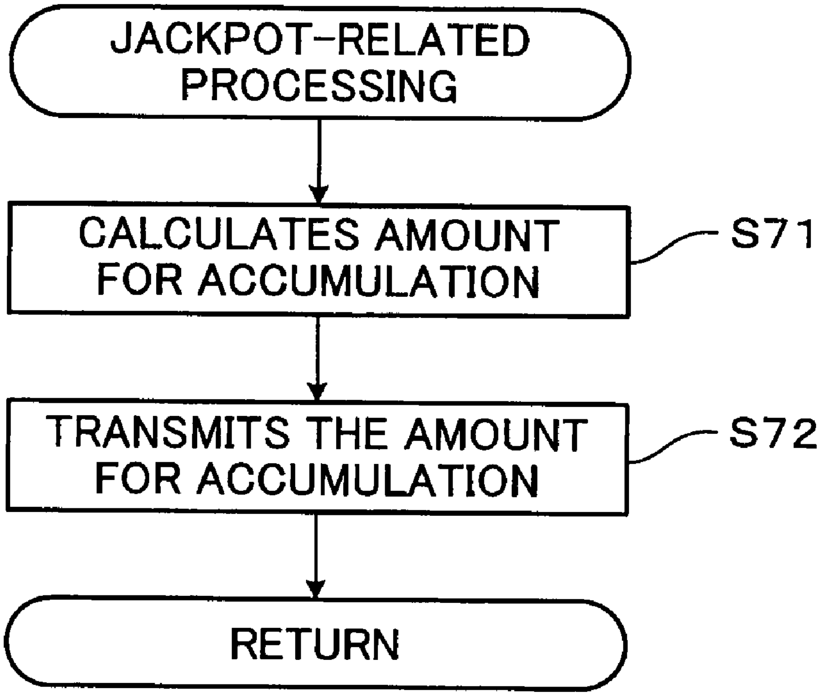
FIG. 13 is a view illustrating a flowchart of the jackpot-related processing for the slot machine according to the embodiment of the present invention.

Now, with reference to FIG. 13, the jackpot-related processing is described. FIG. 13 is a view illustrating a flowchart of the jackpot-related processing for the slot machine 10 according to the embodiment of the present invention.

First, the main CPU 71 calculates the amount for accumulation (S71). The main CPU 71 obtains the product of the value of the bet amount counter and a preset accumulation ratio, so that the amount for accumulation to the amount of jackpot is calculated.

Next, the main CPU 71 transmits the calculated amount for accumulation to the external controller 200 (S72). Upon reception of the amount for accumulation, the external controller 200 updates the amount of jackpot. After the processing has been conducted, the jackpot-related processing is completed.

<Rescue-Related Processing>

Figure 14:
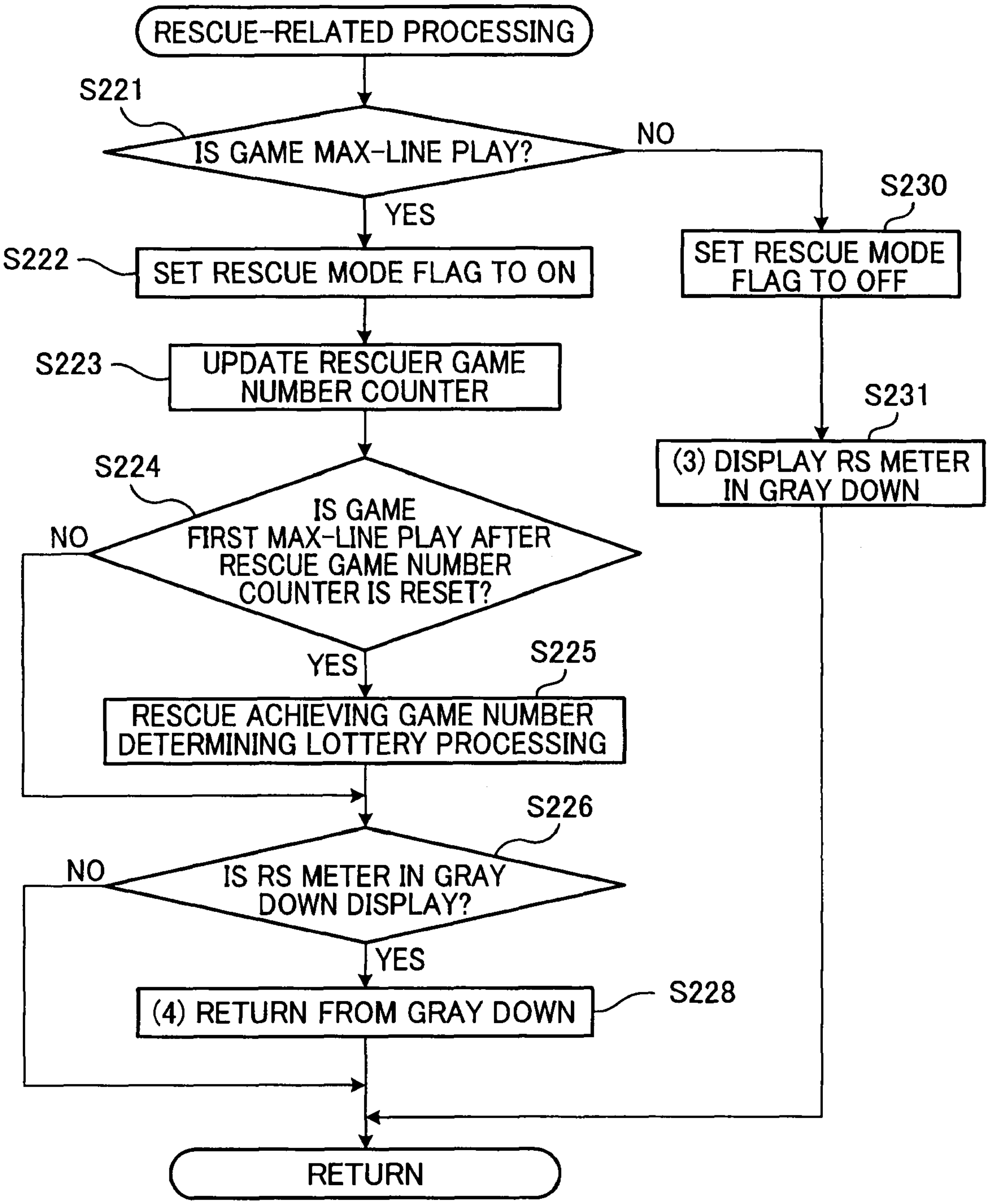
FIG. 14 is a view illustrating a flowchart of a rescue-related processing for the slot machine according to the embodiment of the present invention.

Next, with reference to FIG. 14, the rescue-related processing is described. FIG. 14 is a view illustrating a flowchart of the rescue-related processing for the slot machine 10 according to the embodiment of the present invention.

First, the main CPU 71 determines whether a game is played with "MAX line" (S221). More specifically, whether a game is played with "MAX line" is determined according to whether the MAX-lines button 44 has been pressed. Note that an additional bet to apply the rescue to a game is termed "Ante Bet". Therefore, the rescue is applied to a game only when the game is played with this "Ante Bet". In the present embodiment, the "Ante Bet" is made by pressing the MAX-lines button 44.

When the game is not played with "MAX line", a rescue mode flag is set to off (S230). Thereafter, (3) a gray-down image of the RS meter is displayed (S231). In this process, as shown in (3) in FIG. 25, the entirety of the RS meter 500 is displayed in half tone. This notifies the player that the current game does not involve "Ante Bet", i.e. the rescue is not applied to the game. After the processing has been conducted, the rescue-related processing is completed.

On the other hand, if the game is played with "MAX line", the rescue mode flag is set to on (S222). Thereafter, the rescue game number counter in the RAM 73 is updated (S223). This rescue game number counter manages the number of games until a payout is carried out on account of the rescue. In S223, the main CPU 71 adds 1 to the rescue game number counter.

Subsequently, a determination is made whether the game play is one of the first "MAX line" play after the power on and the first "MAX line" play which is the first after the rescue game number counter is reset in S177 (S224). When the game play is one of the first "MAX line" play after the power on and the first "MAX line" play which is the first after the rescue game number counter is reset in S177, rescue achieving game number determining lottery processing is carried out (S225). In this process, the rescue achieving game number which indicates how many games are to be played in "MAX line" play ("Ante Bet") until a predetermined benefit is awarded is determined by lottery. In the present embodiment, the rescue achieving game number is in the range of 150 to 350.

Now, the following will describe the number of games displayed in each of blocks 502A-502J in the game to which the rescue is applied on account of the "MAX line" play. The block unit 501 of the RS meter 500 is divided into 10 blocks 502A-502J. The number of games displayed on a single block is calculated by dividing the rescue achieving game number determined in S225 by 10 which is the number of blocks. In the present embodiment, the rescue achieving game number is selected by lottery from the number range of 150 to 350. For example, when the selected rescue achieving game number is 150, the number of games displayed in a single block is 15 because 150/10=15. Also, when the selected rescue achieving game number is 158, eight blocks out of ten blocks display "16 games" and the remaining two blocks display "15 games", because 158/10=15.8. As shown in FIG. 23, "16 games" (which is the larger number among the two types) is allocated from the right, i.e. from the block 502J to the block 502C. On the other hand, "15 games" (which is the smaller number among the two types) is allocated to the blocks 502A and 502B.

Now, timings to turn on the blocks 502A-502J will be described. One of the numbers of games displayed on the respective blocks 502A-502J is selected by lottery, and the blocks 502A-502J of the block unit 501 are serially turned on from the left, each time the value of the rescue game number counter reaches the number selected in each block. For example, as shown in FIG. 24, when the selected rescue achieving game number is 150, the number of games displayed on a single block is "15". One number is selected by lottery from "15 games" displayed on each of the blocks 502A-502J. Assume that "15" is selected in the block 502A (turn-on point 510A), "1" is selected in the block 502B (turn-on point 510B), "15" is selected in the block 502C (turn-on point 510C), "7" is selected in the block 502I (turn-on point 510I), and "15" is selected in the block 502J (turn-on point 510J). Lottery is carried out in the same manner in the blocks 502D-502H. As a result, as shown in FIG. 24, each time the value of the rescue game number counter reaches one of the turn-on points 510A-510J, the blocks 502A-502J of the block unit 501 are serially turned on from the left.

More specifically, when the value of the rescue game number counter reaches "15", the block 502A is turned on. Also, when the value of the rescue game number counter reaches "16", the block 502B is turned on. Also, when the value of the rescue game number counter reaches "45", the block 502C is turned on. Similarly, when the value of the rescue game number counter reaches "127", the block 502I is turned on. Also, when the value of the rescue game number counter reaches "150", the block 502J is turned on.

Subsequently, after the processing in S225 or when it is determined in S224 that the game play is not one of the first "MAX line" play after the power on and the first "MAX line" play which is the first after the rescue game number counter is reset in S177, the main CPU 71 determines whether the RS meter 500 is in gray down display (S226). In other words, a determination is made whether the entirety of the RS meter 500 is in half tone display.

If it is determined that the RS meter 500 is in gray down display, (4) a processing to return from the gray down is carried out (S228). In this processing, an animation is displayed to shift from the state in which the entirety of the RS meter 500 is in half tone display to the state in which the half tone display is removed (see FIG. 25(4)).

Thereafter, when it is determined in S226 that the RS meter 500 is not in gray down display or after the step S228, the rescue-related processing ends.

<Symbol Lottery Processing>

Figure 15:
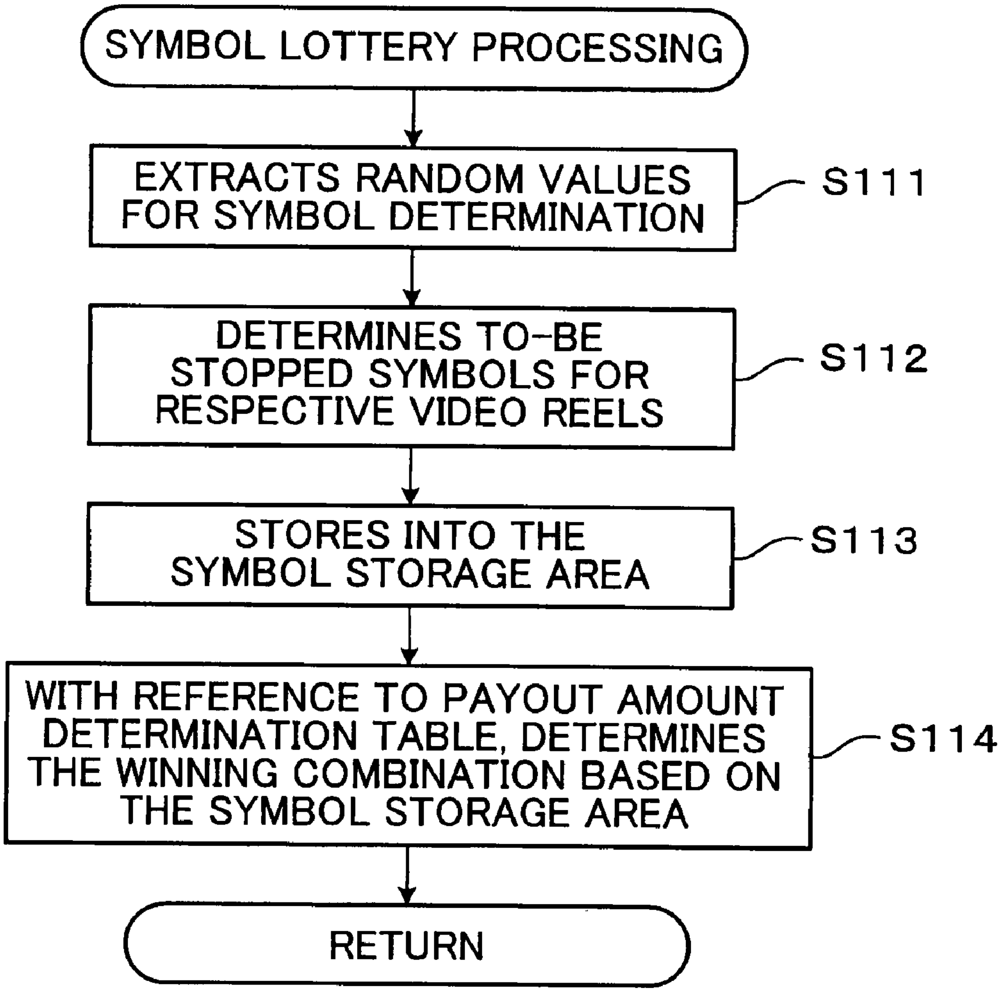
FIG. 15 is a view illustrating a flowchart of the symbol lottery processing for the slot machine according to the embodiment of the present invention.

Next, with reference to FIG. 15, the symbol lottery processing is described. FIG. 15 is a view illustrating a flowchart of the symbol lottery processing for the slot machine 10 according to the embodiment of the present invention.

First, the main CPU 71 extracts random numbers for symbol determination (S111). The main CPU 71 then determines to-be-stopped symbols for the respective video reels 151-155 by lottery (S112). The main CPU 71 holds a lottery for each video reel 151-155, and determines any one of the 22 symbols (code numbers from "00" to "21") as a to-be-stopped symbol.

The main CPU 71 then stores the determined to-be-stopped symbols for the respective video reels 151-155 into a symbol storage area provided in the RAM 73 (S113). Next, the main CPU 71 references the payout amount determination table (see FIG. 10) and determines a winning combination based on the symbol storage area (S114). The main CPU 71 determines a winning combination based on a combination of symbols displayed on a winning line on the video reels 151-155 and based on the payout amount determination table. After the processing has been conducted, the symbol lottery processing is completed.

<Symbol Display Control Processing>

Figure 16:
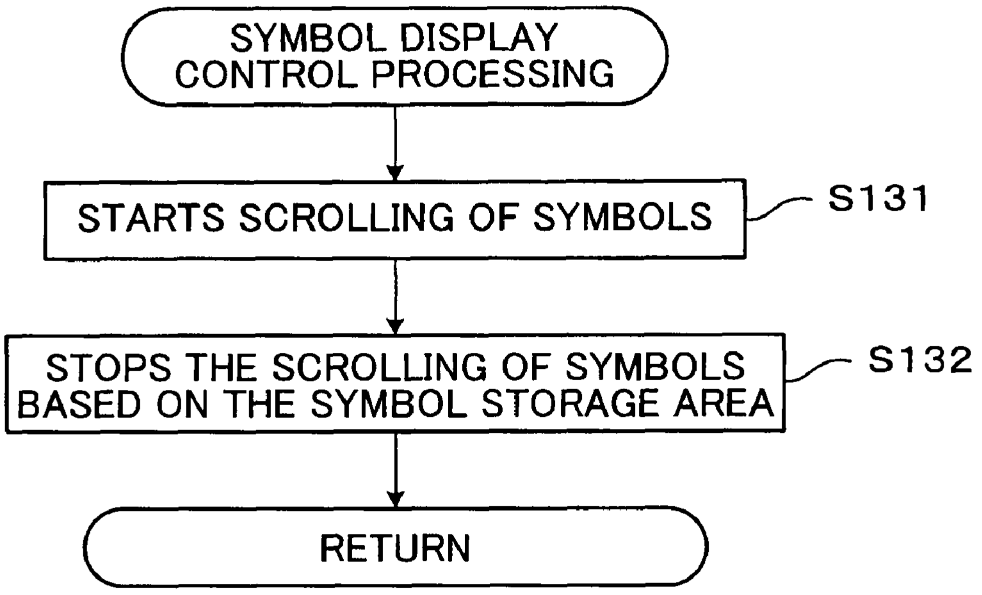
FIG. 16 is a view illustrating a flowchart of the symbol display control processing for the slot machine according to the embodiment of the present invention.

Next, with reference to FIG. 16, the symbol display control processing is described. FIG. 16 is a view illustrating a flowchart of the symbol display control processing for the slot machine 10 according to the embodiment of the present invention.

First, the main CPU 71 starts scrolling of the symbol arrays of the respective video reels 151-155 that are displayed to the display window 150 of the lower image display panel 141 (S131). The main CPU 71 then stops the scrolling of the symbol arrays of the respective video reels 151-155, based on the aforementioned symbol storage area (S132). After the processing has been conducted, the symbol display control processing is completed.

<Payout Amount Determination Processing>

Figure 17:
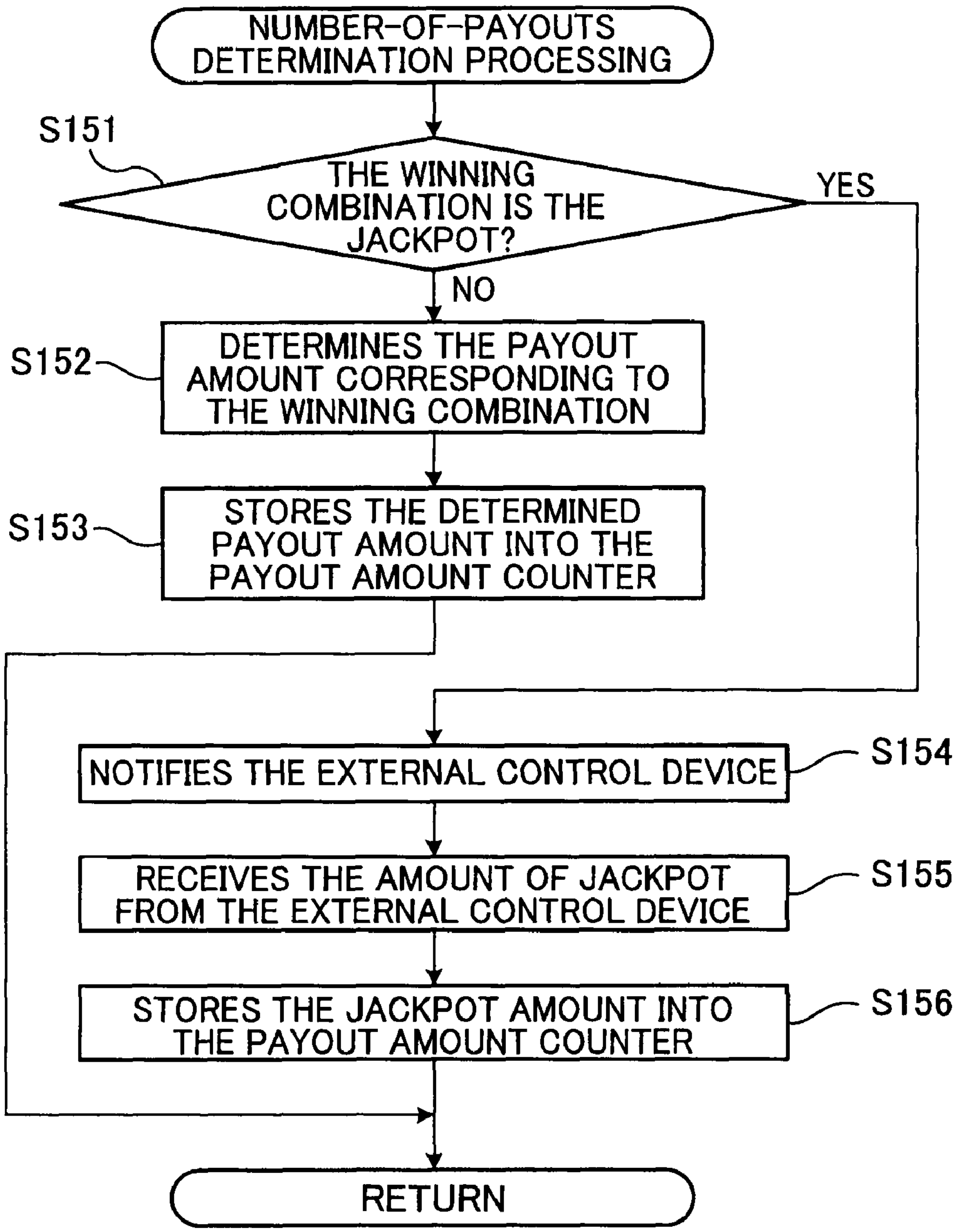
FIG. 17 is a view illustrating a flowchart of the payout amount determination processing for the slot machine according to the embodiment of the present invention.

Next, with reference to FIG. 17, the payout amount determination processing is described. FIG. 17 is a view illustrating a flowchart of the payout amount determination processing for the slot machine 10 according to the embodiment of the present invention.

The main CPU 71 first determines whether or not the winning combination is the jackpot (S151). When the main CPU 71 determines that the winning combination is not the jackpot, the main CPU 71 determines the payout amount corresponding to the winning combination (S152). The determination of the payout amount is identical with the aforesaid explanation with reference to FIG. 10. It is to be noted that the main CPU 71 determines "0" as the payout amount in the case where the game is lost. Next, the main CPU 71 stores the determined payout amount into the payout amount counter (S153). After the processing has been conducted, the payout amount determination processing is completed.

When the main CPU 71 determines that the winning combination is the jackpot, the main CPU 71 notifies the external controller 200 of the winning of the jackpot (S154). It is to be noted that, upon reception of the notification, the external controller 200 transmits to the slot machine 10 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external controller 200 (S155). The main CPU 71 then stores the received amount of jackpot into the payout amount counter (S156). After the processing has been conducted, the payout amount determination processing is completed.

<Rescue Check Processing>

Figure 18:
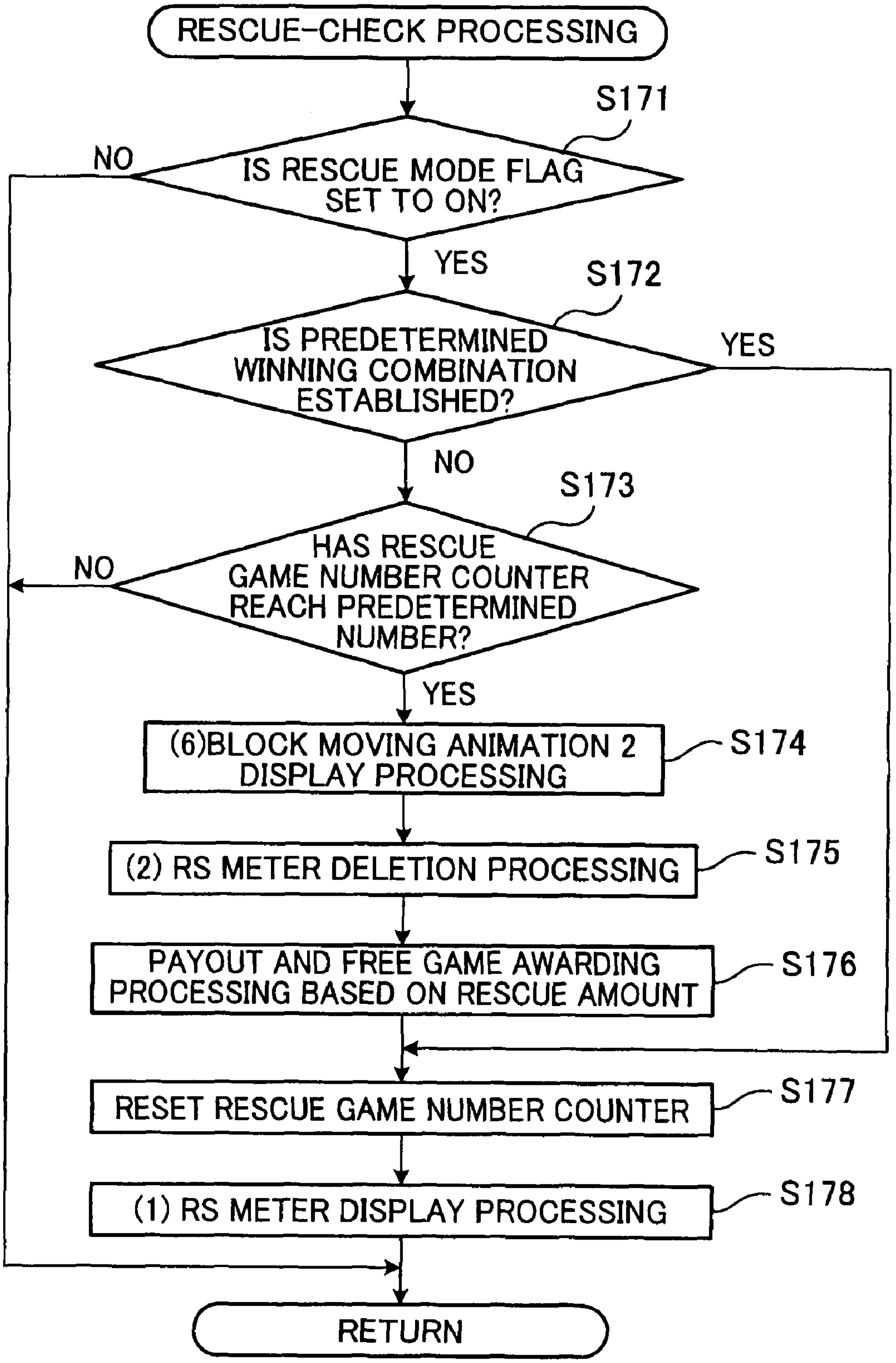
FIG. 18 is a view illustrating a flowchart of the rescue check processing for the slot machine according to the embodiment of the present invention.

Next, with reference to FIG. 18, a rescue check processing is described. FIG. 18 shows a flowchart of a rescue check processing in the slot machine 10 according to the embodiment of the present invention.

First, the main CPU 71 determines whether or not the rescue mode flag is turned on (S171). If it is determined that the rescue mode flag is not in the on state, the main CPU 71 ends the rescue check processing.

When the main CPU 71 determines that the rescue mode flag is turned on, the main CPU 71 determines whether or not a predetermined winning combination has been established (S172). In the present embodiment, "free game trigger", "jackpot" and "mystery bonus" are subjects of the predetermined winning combination.

When the main CPU 71 determines that the predetermined winning combination has not been established, the main CPU 71 determines whether or not the value of the rescue game number counter has reached a predetermined number of times (e.g. 150) (S173). The main CPU 71 ends the rescue check processing if it is determined that the rescue game number counter has not reached the predetermined number.

On the other hand, the main CPU 71 carries out (6) block moving animation 2 display processing if it is determined that the rescue game number counter has reached the predetermined number (e.g. 150) (S174). In this processing, the entirety of the RS meter 500 blinks. More specifically, the entirety of the RS meter 500 blinks when the rightmost block 502 of the block unit 501 in the RS meter 500 is turned on. In other words, the rescue is achieved. Thereafter, the main CPU 71 carries out (2) processing of deleting the RS meter (S175). In this processing, when the block unit 501 of the RS meter 500 in the lower image display panel 141 has been displayed, the unit 501 is no longer displayed (see FIG. 25(2)).

After the processing above, a payout is awarded according to the rescue amount and a free game is awarded, as a benefit of the rescue achievement (S176). The main CPU 71 adds an amount (e.g. 200) previously set as the amount of rescue to the value stored in the credit amount counter. Furthermore, a free game is awarded. In other words, a later-described free game running processing is carried out.

After S176 or when determining in S172 that the predetermined winning combination has been established, the main CPU 71 resets the rescue game number counter (S177). Thereafter, the main CPU 71 carries out (1) a processing to display the RS meter (S178). In this processing, an animation is displayed to indicate the shift from the state in which only the text portion 503 of the RS meter 500 is displayed to the state in which the block unit 501 is displayed (see FIG. 25(1)). After the processing has been conducted, the rescue check processing is completed.

<Free Game Running Processing>

Figure 19:
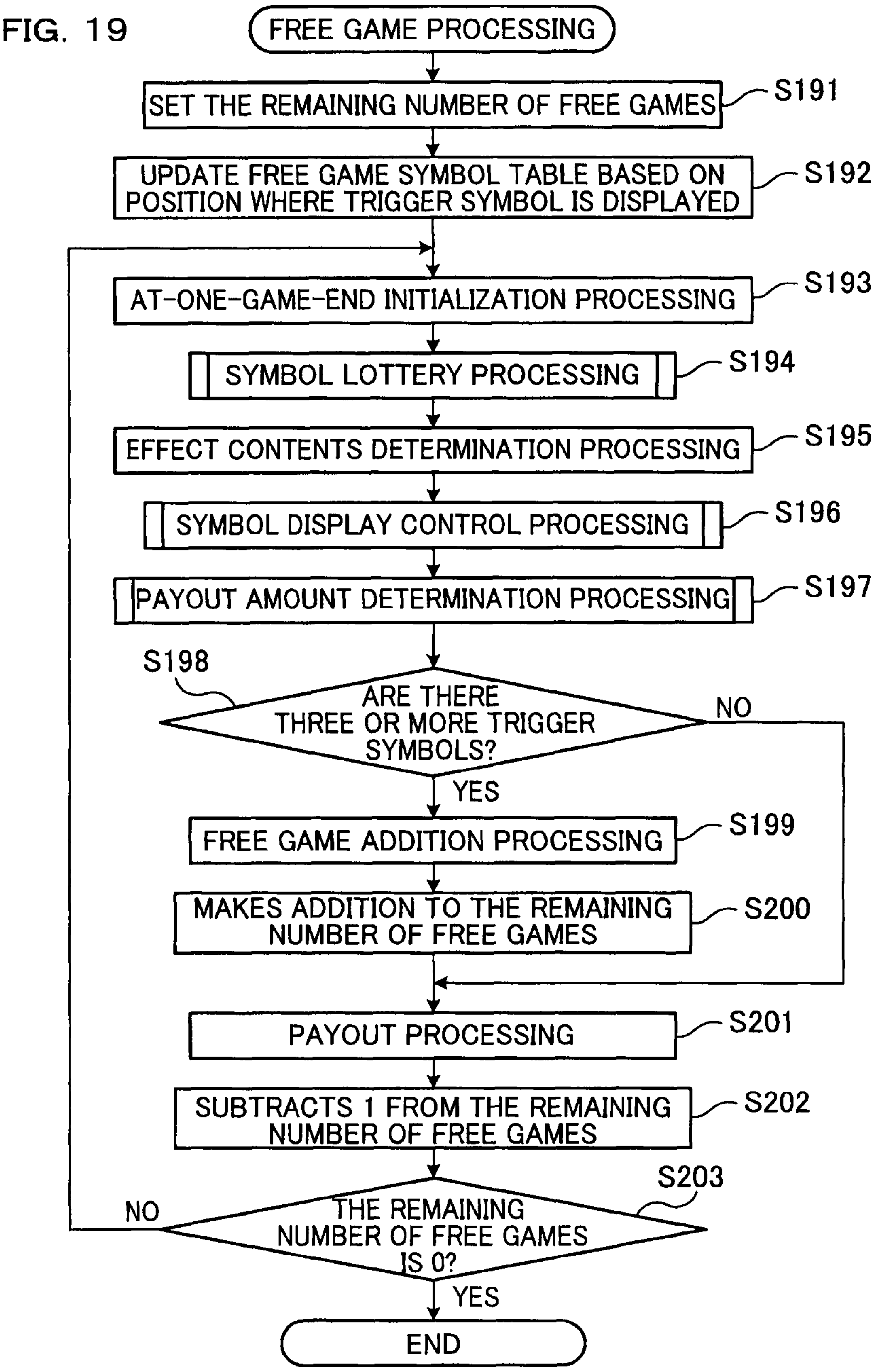
FIG. 19 is a view illustrating a flowchart of the free game running processing for the slot machine according to the embodiment of the present invention.
Figure 21A:
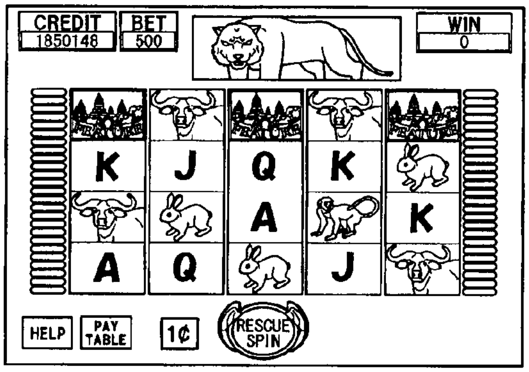
FIG. 21 shows an image displayed at the time of shifting from a base game to a free game.
Figure 21B:
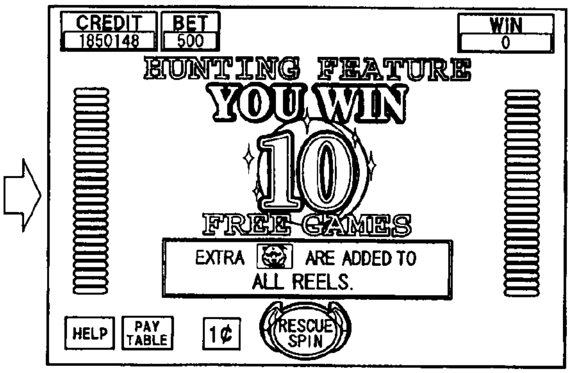
Figure 21C:
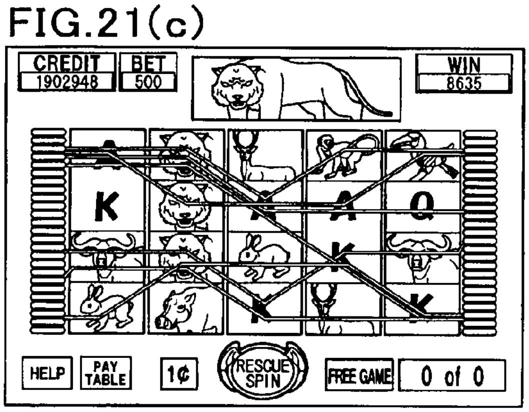
Figure 21D:
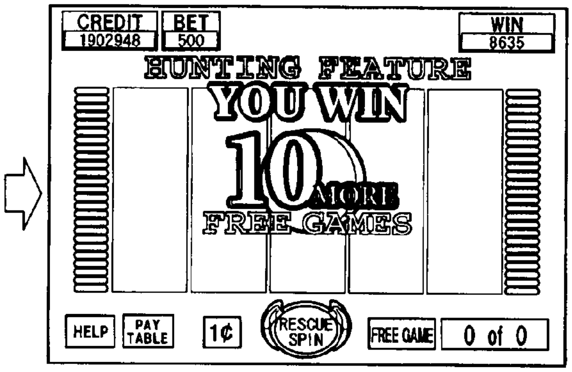
Figure 21E:
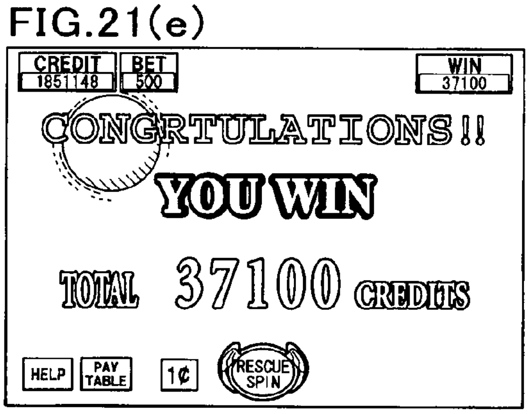
Figure 21F:
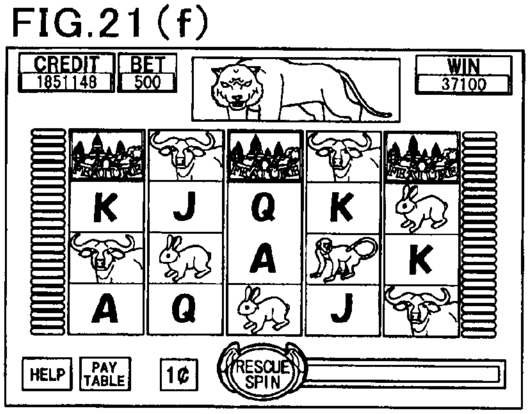
Figure 22A:
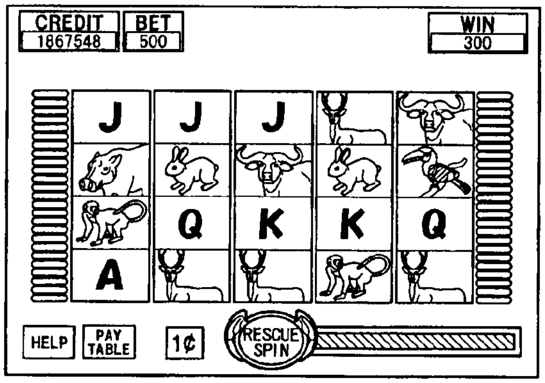
FIG. 22 shows an image displayed at the time of shifting from rescue achievement to a free game.
Figure 22B:
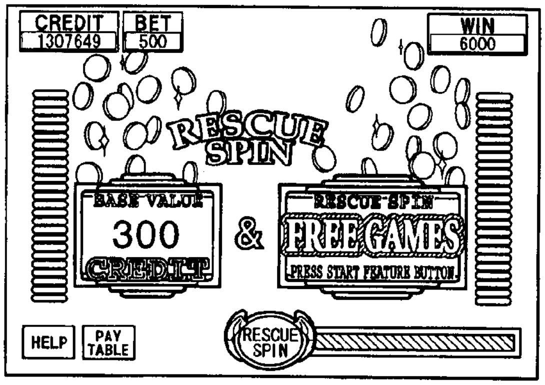
Figure 22C:
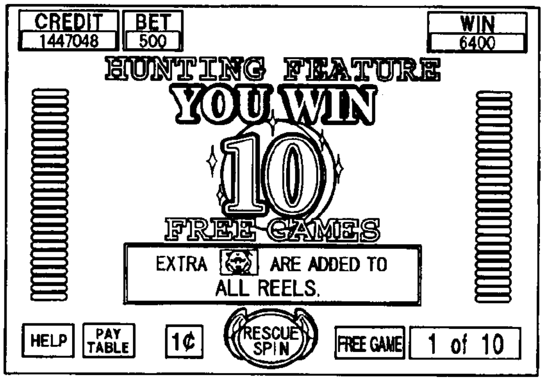
Figure 22D:
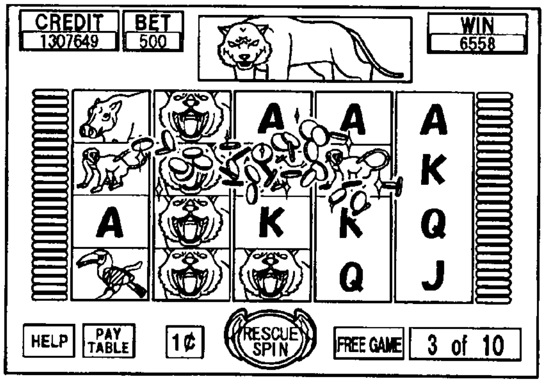
Figure 22E:
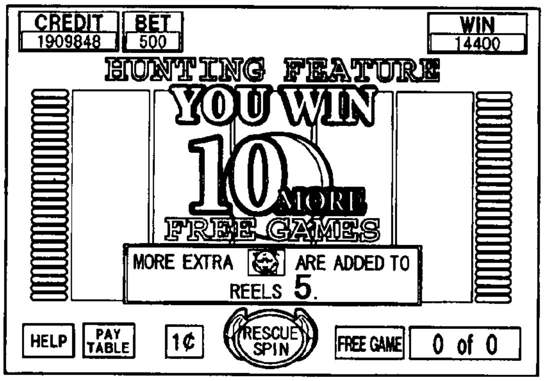
Figure 22F:
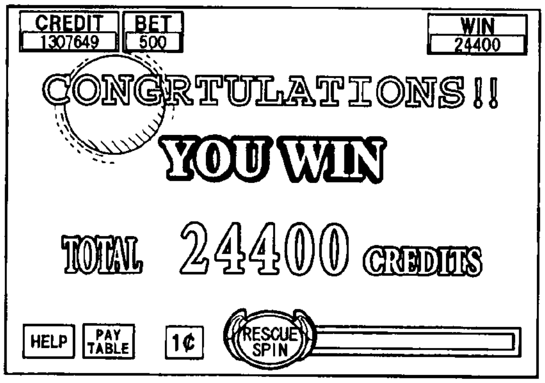
Figure 22G:
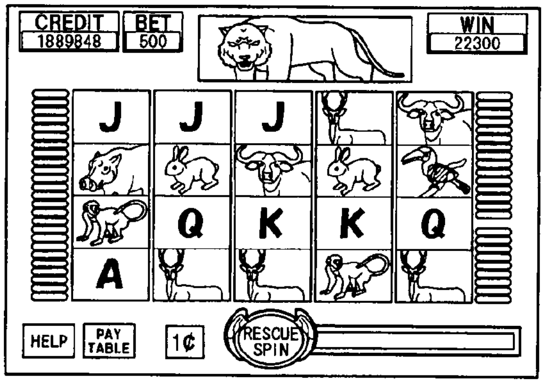

Now, a free game running processing will be described with reference to FIGS. 19-22. FIG. 19 shows a flowchart of a free game running processing of the slot machine 10 according to the embodiment of the present invention. FIG. 20 shows a free game symbol table. FIG. 21 shows an image displayed at the time of the shift from a base game to a free game. FIG. 22 shows an image displayed at the time of the shift from rescue achievement to a free game.

First, the main CPU 71 sets a remaining free game count T to T=F (=specific number of times=7) in the free game count recording region of the RAM 73 (S191). Also, the main CPU 71 causes the lower image display panel 141 to display a free game occurrence image (see FIG. 21(*b*) or FIG. 22(*c*)).

Thereafter, the main CPU 71 carries out a free game symbol table updating processing (S192). In this processing, the main CPU 71 updates the free game symbol table based on a position where "FEATURE" which is a trigger symbol is rearranged. More specifically, among the 20 symbols rearranged on the display window 150, "WILD" ("TIGER") is newly set to the code number corresponding to a symbol displayed below the position where "FEATURE" which is a trigger symbol is rearranged.

For example, when "FEATURE" which is a trigger symbol is rearranged in the topmost block of the second video reel 152, the topmost block of the third video reel 153, and the upper-center block of the fifth video reel 155, a free game symbol table shown in FIG. 20 is generated.

After the step S192, the main CPU 71 carries out the steps S193-S197. These steps are substantially identical with the steps S12, S14, and S16-S18 shown in FIG. 11, and hence the following will only describe differences between the steps.

In S14 in FIG. 11, a to-be-stopped symbol is determined based on the base game symbol table. On the other hand, a to-be-stopped symbol is determined in S194 based on a free game symbol table.

In S197, a payout amount is determined on the premise that coins whose number is identical with those bet on the base game which has triggered the free game are bet.

After S197, the main CPU 71 determines whether three or more trigger symbols ("FEATURE") are rearranged (S198).

If it is determined that three or more trigger symbols ("FEATURE") are rearranged, a free game addition processing is carried out (S199). In this processing, the main CPU 71 adds the number of the rearranged trigger symbols ("FEATURE") to the remaining game count T which is indicated by remaining game data stored in the free game count recording region of the RAM 73 (S200).

If it is determined in S198 that three or more trigger symbols ("FEATURE") are not rearranged or after S200, the main CPU 71 carries out a payout processing (S201). This processing is not described here because it is identical with S28 in FIG. 11.

Thereafter, the main CPU 71 subtracts 1 from the remaining free game count T in the free game count recording region of the RAM 73 (S202). Next, the main CPU determines whether the free game count (T) is "0", based on the remaining game data stored in the free game count recording region of the RAM 73 (S203). If it is determined that T is not "0", the main CPU 71 returns to S193. On the other hand, if it is determined in S203 that T=0, the main CPU 71 ends the free game running processing.

The present embodiment has been described hereinabove. The slot machine 10 of the present embodiment allows a player to notify, when a predetermined number of coins are inserted so that the non-rescue mode is shifted to the rescue mode, of the number of games run in the rescue mode, by causing the RS meter 500 including the block unit 501 divided into 10 blocks 502A-502J to turn on a corresponding number of blocks 502A-502J. This allows the player to recognize the remaining number of games until a benefit is obtained as a result of playing games the rescue achieving game number of times, so as to keep the player playing games with interest and excitement.

Also, since the rescue achieving game number is different each time, the game number displayed by each of the blocks 502A-502J can be set in accordance with the rescue achieving game number. This allows the player to visually recognize, as an amount, the remaining number of games to be played until a benefit is awarded when the number of games reaches the rescue achieving game number.

Furthermore, each time the counted number of games reach a number which is determined by lottery for each of the blocks 502A-502J, the blocks 502A-502J of the RS meter 500 are turned on. The timings to turn on the blocks 502A-502J of the RS meter 500 are therefore arranged to be irregular, and hence the player cannot precisely understand the remaining number of games to be played until a benefit is awarded when the number of games reaches the rescue achieving game number, but he/she roughly understands the remaining number of games. This makes it possible to cause the player to play games without letting him/her precisely know the remaining number of games to be played until a benefit is awarded.

Outline of Embodiment

As described above, the present invention discloses a gaming machine (slot machine 10) which includes a display (lower image display panel 141); and a controller (motherboard 70) programmed to execute the following processes of: (a1) running a game in which a predetermined number of game media (medals) are paid out according to the number of game media having been bet; (a2) counting the number of games run in (a1); (a3) displaying, on a gauge table (RS meter 500) divided into plural stages, the number of games counted in (a2); and (a4) awarding a predetermined benefit (free game) when the number of games counted in (a2) reaches a predetermined game count.

According to this arrangement, the player is able to know the number of games having been run, by the gauge table which is divided into plural stages. This allows the player to recognize the remaining number of games until a benefit is obtained as a result of playing games the rescue achieving game number of times, so as to keep the player playing games with interest and excitement.

In addition to the above, the present invention discloses a gaming machine (slot machine 10) which includes a display (lower image display panel 141); and a controller (motherboard 70) programmed to execute the following processes of: (b1) after a game medium whose number is smaller than a predetermined maximum bet amount is bet, running a game in which the plural symbols are variably displayed on the symbol display and the symbols are stopped, and a predetermined number of game media are paid out according to the stopped symbols or a combination of the stopped symbols; (b2) on condition that a predetermined number of game media are inserted, shifting from a non-rescue mode to a rescue mode; (b3) if shifting to the rescue mode is carried out in (b2), displaying a meter table (RS meter 500) which is divided into a predetermined number of blocks; (b4) determining by lottery a rescue achieving game number; (b5) counting the number games run in the rescue mode; (b6) displaying, by the number of blocks (blocks 502A-502J) turned on the meter table, the number of games counted in (b5); (b7) awarding a predetermined benefit when the number of games counted in (b5) reaches the rescue achieving game number determined in (b4); and (b8) if the predetermined benefit is awarded in (b7) or if a game resulting in payout of a predetermined number of game media is run before the number of games counted reaches the rescue achieving game number, initializing the rescue achieving game number determined in (b4) and the number of games counted in (b5).

This arrangement allows the player to notify, when a predetermined number of coins are inserted so that the non-rescue mode is shifted to the rescue mode, of the number of games run in the rescue mode, by displaying the meter table divided into a predetermined number of blocks. This allows the player to recognize the remaining number of games until a benefit is obtained as a result of playing games the rescue achieving game number of times, so as to keep the player playing games with interest and excitement.

In addition to the above, the present invention discloses a gaming machine characterized in that, in (b6), the number of games displayed in one of the blocks is calculated by dividing the rescue achieving game number determined in (b4) by the predetermined number of blocks (10 in the embodiment above).

According to this arrangement, since the rescue achieving game number is different each time, the game number displayed by each of the blocks can be set in accordance with the rescue achieving game number. This allows the player to visually recognize, as an amount, the remaining number of games to be played until a benefit is awarded when the number of games counted by the rescue game number counter reaches the rescue achieving game number.

In addition to the above, the present invention discloses a gaming machine characterized in that, in (b6), for each of the blocks displayed on the meter, a single number is selected by lottery from the number of games displayed by each of the blocks, and each time the number of games counted in (b5) reaches the number selected for each of the blocks by lottery, one of the blocks of the meter table is turned on.

According to this arrangement, one of the blocks on the meter table is turned on each time the number of games counted reaches the number selected for each block by lottery. The timings to turn on the blocks of the meter table are therefore arranged to be irregular, and hence the player cannot precisely understand the remaining number of games to be played until a benefit is awarded when the number of games reaches the rescue achieving game number, but he/she roughly understands the remaining number of games. This makes it possible to cause the player to play games without letting him/her precisely know the remaining number of games to be played until a benefit is awarded.

The present invention discloses a method of controlling a gaming machine, which includes the steps of: (c1) after a game medium whose number is smaller than a predetermined maximum bet amount is bet, running a game in which the plural symbols are variably displayed on the symbol display and the symbols are stopped, and a predetermined number of game media are paid out according to the stopped symbols or a combination of the stopped symbols; (c2) on condition that a predetermined number of game media are inserted, shifting from a non-rescue mode to a rescue mode; (c3) if shifting to the rescue mode is carried out in (c2), displaying a meter table which is divided into a predetermined number of blocks; (c4) determining by lottery a rescue achieving game number; (c5) counting the number of games run in the rescue mode; (c6) displaying, by the number of blocks turned on the meter table, the number of games counted in (c5); (c7) awarding a predetermined benefit when the number of games counted in (c5) reaches the rescue achieving game number determined in (c4); and (c8) if the predetermined benefit is awarded in (c7) or if a game resulting in payout of a predetermined number of game media is run before the number of games counted reaches the rescue achieving game number, initializing the rescue achieving game number determined in (c4) and the number games counted in (c5), wherein, in (c6), the number of games displayed in one of the blocks is calculated by subtracting the predetermined number of blocks from the rescue achieving game number determined in (c4), for each of the blocks displayed on the meter table, a single number is selected by lottery from the number of games displayed by each of the blocks, and each time the number of games counted in (c5) reaches the number selected by lottery for each of the blocks, one of the blocks of the meter table is turned on.

This arrangement allows the player to notify, when a predetermined number of coins are inserted so that the non-rescue mode is shifted to the rescue mode, of the number of games run in the rescue mode, by displaying the meter table divided into a predetermined number of blocks. This allows the player to recognize the remaining number of games until a benefit is obtained as a result of playing games the rescue achieving game number of times, so as to keep the player playing games with interest and excitement.

Also, since the rescue achieving game number is different each time, the game number displayed by each of the blocks can be set in accordance with the rescue achieving game number. This allows the player to recognize the remaining number of games until a benefit is obtained as a result of playing games the rescue achieving game number of times, so as to keep the player playing games with interest and excitement.

Also, one of the blocks on the meter table is turned on each time the number of games counted reaches the number selected for each block by lottery. The timings to turn on the blocks of the meter table are therefore arranged to be irregular, and hence the player cannot precisely understand the remaining number of games to be played until a benefit is awarded when the number of games reaches the rescue achieving game number, but he/she roughly understands the remaining number of games. This makes it possible to cause the player to play games without letting him/her precisely know the remaining number of games to be played until a benefit is awarded.

The present embodiment deals with a case where the number of paylines 300 is 50; however, the number of paylines is not limited to this.

Furthermore, the free game of the present invention is not limited to the above, and the free game may be different from a game run in a slot machine. Examples of the free game include: a card game such as poker and a shooting game.

In addition to the above, the embodiment above is arranged so that one of the blocks 502A-502J of the RS meter 500 is turned on each time the number of games run in the rescue mode reaches the number selected for each of the blocks 502A-502J by lottery, and since the timings of turn on the blocks 502A-502J of the RS meter 500 are irregular, the player cannot precisely understand the remaining number of games to be played until a benefit is awarded when the number of games reaches the rescue achieving game number, but he/she roughly understands the remaining number of games. Alternatively, the player may be notified the rough number of games to be played until a benefit is awarded when the number of games reaches the rescue achieving game number, by changing the color of the blocks 502A-502J of the RS meter 500.

Also, although the embodiment above is arranged so that the RS meter 500 is displayed on the lower image display panel 141, the RS meter 500 may be formed by LEDs or lamps. This arrangement allows the RS meter 500 to be provided at any part of the cabinet 11 of the slot machine 10.

The embodiment above deals with a case where the slot machine 10 is a video slot machine. However, the slot machine 10 of the present invention may partially adopt a mechanical reel in place of the video reels 151 to 155.

The above embodiment thus described solely serves as a specific example of the present invention, and the present invention is not limited to such an example. Specific structures of various means and the like may be suitably designed or modified. Further, the effects of the present invention described in the above Embodiments are no more than examples of most preferable effects achievable by the present invention. The effects of the present invention are not limited to those described in the Embodiments of the present invention described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a symbol display which is able to variably display plural symbols; and a controller programmed to execute the following processes of:

(b1) after a game medium whose number is smaller than a predetermined maximum bet amount is bet, running a game in which the plural symbols are variably displayed on the symbol display and the symbols are stopped, and a predetermined number of game media are paid out according to the stopped symbols or a combination of the stopped symbols;

(b2) on condition that a predetermined number of game media, which is not smaller than a minimum bet amount and not larger than the maximum predetermined bet amount, are inserted in (b1), automatically shifting from a non-rescue mode to a rescue mode without an additional input from a game player after insertion of the game media, and on condition that the predetermined number of game media are not inserted in (b1), maintaining the non-rescue mode;

(b3) if automatic shifting to the rescue mode is carried out in (b2), displaying a meter table which is divided into a predetermined number of blocks;

(b4) determining by lottery a rescue achieving game number;

(b5) counting the number games run in the rescue mode;

(b6) displaying, by the number of blocks turned on the meter table, the number of games counted in (b5);

(b7) awarding a predetermined benefit when the number of games counted in (b5) reaches the rescue achieving game number determined in (b4); and (b8) if the predetermined benefit is awarded in (b7) or if a game resulting in payout of a predetermined number of game media is run in (b1) before the number of games counted reaches the rescue achieving game number, initializing the rescue achieving game number determined in (b4) and the number of games counted in (b5).

2. The gaming machine according to claim 1, wherein, in (b6), the number of games displayed in one of the blocks is calculated by dividing the rescue achieving game number determined in (b4) by the predetermined number of blocks.

3. The gaming machine according to claim 1, further comprising:

in (b1) a game is executed such that, after a predetermined number of paylines to be activated is determined based on a bet amount, the symbols are variably displayed on the symbol display and are stopped, and the predetermined number of game media are paid out according to the stopped symbols or a combination of the stopped symbols, and in (b2), when the predetermined number of paylines are activated in (b1), shifting from the non-rescue mode to the rescue mode is automatically carried out, whereas, when the predetermined number of paylines are not activated in (b1), the non-rescue mode is maintained.

4. The gaming machine according to claim 1, further comprising:

in (b3), when shifting from the non-rescue mode to the rescue mode is carried out, the meter table is changed from a state in which the entirety of the meter table is displayed in half tone to a state of no half tone, and when shifting from the rescue mode to the non-rescue mode is carried out, the meter table is changed from the state of no half tone to the state in which the entirety of the meter table is displayed in half tone.

5. A method of controlling a gaming machine, which is executed by a processor of the gaming machine, the method comprising the steps of:

(c1) after a game medium whose number is smaller than a predetermined maximum bet amount is bet, running a game in which the plural symbols are variably displayed on the symbol display and the symbols are stopped, and a predetermined number of game media are paid out according to the stopped symbols or a combination of the stopped symbols;

(c2) on condition that a predetermined number of game media, which is not smaller than a minimum bet amount and not larger than the maximum predetermined bet amount, are inserted in (c1), automatically shifting from a non-rescue mode to a rescue mode without an additional input from a game player after insertion of the game media, and on condition that the predetermined number of game media are not inserted in (c1), maintaining the non-rescue mode;

(c3) if automatic shifting to the rescue mode is carried out in (c2), displaying a meter table which is divided into a predetermined number of blocks;

(c4) determining by lottery a rescue achieving game number;

(c5) counting the number of games run in the rescue mode;

(c6) displaying, by the number of blocks turned on the meter table, the number of games counted in (c5);

(c7) awarding a predetermined benefit when the number of games counted in (c5) reaches the rescue achieving game number determined in (c4); and (c8) if the predetermined benefit is awarded in (c7) or if a game resulting in payout of a predetermined number of game media is run in (c1) before the number of games counted reaches the rescue achieving game number, initializing the rescue achieving game number determined in (c4) and the number games counted in (c5), wherein, in (c6), the number of games displayed in one of the blocks is calculated by subtracting the predetermined number of blocks from the rescue achieving game number determined in (c4), for each of the blocks displayed on the meter table, the number of games displayed by each of the blocks is randomly determined, and each time the number of games counted in (c5) reaches the number of games having been randomly determined for each of the blocks, one of the blocks of the meter table is turned on.

6. A gaming machine awarding a rescue payout when the number of games reaches a rescue achieving game number, comprising:

a symbol display which is able to variably display plural symbols;

an effect display; and a controller programmed to execute the following processes of:

(d1) displaying a meter divided into a predetermined number of blocks on the effect display to display a number of games having been executed;

(d2) randomly determining the rescue achieving game number;

(d3) for each of the blocks displayed on the meter, randomly determining a number of games displayed in each of the blocks so as to be different among the blocks;

(d4) counting the number of games having been executed;

(d5) turning on each of the blocks displayed on the meter, each time the number of games counted in (d4) reaches, in each of the blocks, the number determined in (d3) for each of the blocks; and (d6) awarding the rescue payout when the number of games counted in (d4) reaches the rescue achieving game number determined in (d2).

* * * * *